United States Patent
Yoshida

(10) Patent No.: US 10,838,557 B2
(45) Date of Patent: Nov. 17, 2020

(54) INFORMATION INPUT SYSTEM, PROGRAM, MEDIUM

(75) Inventor: Kenji Yoshida, Tokyo (JP)

(73) Assignee: I.P. SOLUTIONS LTD., Tokyo (JP)

(*) Notice: Subject to any disclaimer, the term of this patent is extended or adjusted under 35 U.S.C. 154(b) by 339 days.

(21) Appl. No.: 13/988,945

(22) PCT Filed: Nov. 22, 2011

(86) PCT No.: PCT/JP2011/076965
§ 371 (c)(1),
(2), (4) Date: Sep. 18, 2013

(87) PCT Pub. No.: WO2012/070593
PCT Pub. Date: May 31, 2012

(65) Prior Publication Data
US 2014/0002417 A1  Jan. 2, 2014

(30) Foreign Application Priority Data
Nov. 22, 2010 (JP) ................. 2010-260432

(51) Int. Cl.
*G06F 3/044* (2006.01)
*A63F 13/00* (2014.01)
(Continued)

(52) U.S. Cl.
CPC .............. *G06F 3/044* (2013.01); *A63F 13/00* (2013.01); *A63F 13/213* (2014.09); *G06F 3/039* (2013.01);
(Continued)

(58) Field of Classification Search
CPC .............. A63F 13/06; A63F 2300/1075; A63F 13/213; A63F 13/00; A63F 13/90;
(Continued)

(56) References Cited

U.S. PATENT DOCUMENTS 5,751,276 A * 5/1998 Shih ................ G06F 3/0418
  345/178
6,367,015 B1 * 4/2002 Kubo ................ G06F 3/0488
  345/173
(Continued)

FOREIGN PATENT DOCUMENTS

CN  101512471 A  8/2009
EP  0 0274 592 A1  7/1988
(Continued)

OTHER PUBLICATIONS

International Search Report for PCT/JP2011/076965, dated Mar. 6, 2012.
(Continued)

*Primary Examiner* — Dong Hui Liang
(74) *Attorney, Agent, or Firm* — Patshegen IP LLC

(57) ABSTRACT

An information input system with a touch panel-mounted information processing device which inputs the position, direction and code information of a card when the card is placed on the touch panel, and further inputs information combining the position of a finger and information of the card when the touch panel is touched through the card. The information input system includes a touch panel that receives operations by the user by an electrostatic capacitance method, an information processing unit with the touch panel as input means, and a thin-plate medium to be placed on the touch panel. The information processing unit identifies, using a predetermined calibration method, code information defined in the medium and medium information including the placing position and placing direction of the medium, and identifies coordinate values in a touch panel coordinate system for specifying the position on the medium surface touched by the user in touch operations.

43 Claims, 27 Drawing Sheets

(51) Int. Cl.
- *A63F 13/213* (2014.01)
- *G06F 3/039* (2013.01)
- *G06F 3/0488* (2013.01)
- G06F 3/042 (2006.01)
- G06F 3/041 (2006.01)
- A63F 13/20 (2014.01)
- A63F 13/90 (2014.01)

(52) U.S. Cl.
CPC ............ *G06F 3/0488* (2013.01); *A63F 13/20* (2014.09); *A63F 13/90* (2014.09); *A63F 2300/1075* (2013.01); *A63F 2300/1087* (2013.01); *A63F 2300/30* (2013.01); *G06F 3/041* (2013.01); *G06F 3/042* (2013.01)

(58) Field of Classification Search
CPC .............. A63F 13/20; A63F 2300/1087; A63F 2300/30; G06F 3/0421; G06F 3/0425; G06F 3/0428; G06F 21/31; G06F 3/0321; G06F 3/041; G06F 3/042; G06F 3/044; G06F 3/039; G06F 3/0488; G06F 3/0412; G06F 2203/04112; H04N 1/00411
USPC ..................... 345/173–178; 178/18.01–20.04
See application file for complete search history.

(56) References Cited

U.S. PATENT DOCUMENTS

| | | | |
|---|---|---|---|
| 8,381,992 B2* | 2/2013 | Hamm | G06K 19/0716 235/380 |
| 2005/0197188 A1* | 9/2005 | Iizuka | A63F 13/06 463/36 |
| 2006/0256090 A1* | 11/2006 | Huppi | A63F 13/02 345/173 |
| 2007/0062852 A1 | 3/2007 | Zachut et al. | |
| 2007/0106942 A1* | 5/2007 | Sanaka | G06F 3/04883 715/733 |
| 2007/0159336 A1 | 7/2007 | Tethrake et al. | |
| 2008/0192300 A1* | 8/2008 | Kenji | A63F 13/00 358/3.29 |
| 2008/0207323 A1* | 8/2008 | Hiroshige | A63F 13/02 463/32 |
| 2009/0087076 A1* | 4/2009 | Jenrick | G07D 7/00 382/135 |
| 2009/0261167 A1* | 10/2009 | Iwayama | G06K 7/0008 235/454 |
| 2009/0282323 A1 | 11/2009 | Sakamoto et al. | |
| 2010/0012396 A1 | 1/2010 | Ogawa | |
| 2010/0149119 A1 | 6/2010 | Homma et al. | |
| 2010/0302171 A1 | 12/2010 | Yoshida | |
| 2011/0108625 A1* | 5/2011 | Lee | G06K 19/06 235/448 |
| 2012/0068962 A1 | 3/2012 | Yamamoto et al. | |
| 2013/0115878 A1 | 5/2013 | Thiele et al. | |
| 2013/0194192 A1* | 8/2013 | Andolina | G06K 9/186 345/173 |
| 2013/0284578 A1 | 10/2013 | Foerster et al. | |

FOREIGN PATENT DOCUMENTS

| | | | | |
|---|---|---|---|---|
| EP | 2071437 A1 * | 6/2009 | | G06F 3/042 |
| EP | 2 177 975 A1 | 4/2010 | | |
| JP | 4-36822 A | 2/1992 | | |
| JP | H11-45318 A | 2/1999 | | |
| JP | 2001-319207 A | 11/2001 | | |
| JP | 2002-164021 A | 6/2002 | | |
| JP | 2002-239207 A | 8/2002 | | |
| JP | 2007-279356 A | 10/2007 | | |
| JP | 4019114 B1 | 12/2007 | | |
| JP | 4043453 B2 | 2/2008 | | |
| JP | 2008-178499 A | 8/2008 | | |
| JP | 2010-61351 A | 3/2010 | | |
| JP | 2010-187911 A | 9/2010 | | |
| JP | 2010-198799 A | 9/2010 | | |
| JP | 2013-529800 A | 7/2013 | | |
| WO | WO 2004/091956 A2 * | 10/2004 | | |
| WO | 2008/050468 A1 | 5/2008 | | |
| WO | 2010/002147 A3 | 1/2010 | | |
| WO | 2012/038434 A1 | 3/2012 | | |

OTHER PUBLICATIONS

Extended (supplementary) European Search Report dated Apr. 18, 2017, issued in counterpart European Application No. 11842555.2. (9 pages).

* cited by examiner

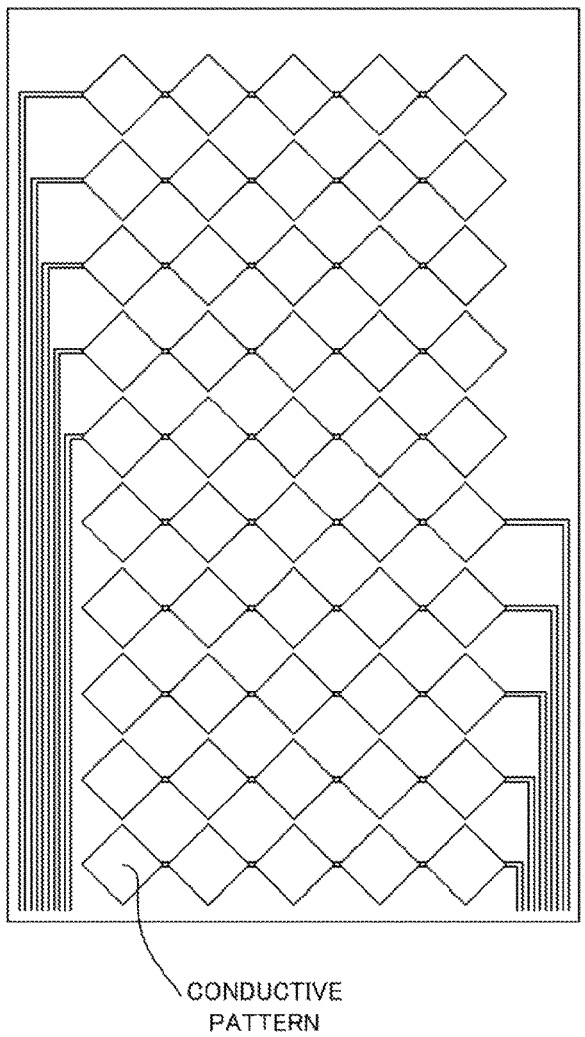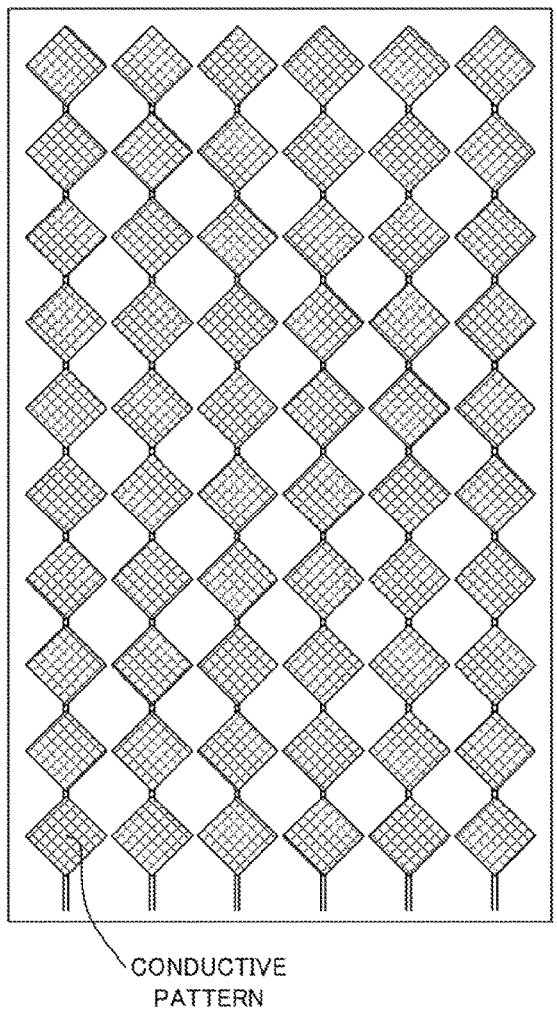

MEDIUM IS COIN SHAPE

MAKE CODE BY SHAPE AND SIZE OF QUADRANGLE

ND BACKGROUND TEXT

INFORMATION INPUT SYSTEM, PROGRAM, MEDIUM

FIELD OF THE INVENTION

The present invention relates to an information input using a touch panel (a touch screen) of an electrostatic capacitance method.

BACKGROUND OF THE INVENTION

The following prior technologies are applied as techniques to input information by a combination of an input operation to the touch panel and recognition of the position and direction of a card placed on the touch panel and information unique to the card (hereinafter, in the present invention, referred to as the "code information").

As for an input operation to the touch panel, Japanese Patent No. 4019114 describes a method of using a touch panel of an infrared blocking method (Paragraphs 0144, 0210, and the like).

As for recognition of the position and direction of a card and the code information, there has been described a method for recognizing the position and direction of the card and the code information by reading the dot patterns printed on the card by an imaging unit underneath the touch panel. (Paragraph 0113 and the like).

According to Japanese Unexamined Patent Application Publication No. 2010-187911, as for an input operation to the touch panel, a method of using a touch panel of an electrostatic capacitance method is described. (Paragraph 0131 and the like).

Further, there has been described that the touch panel of the electrostatic capacitance method can detect a touch position even when the touch panel is touched through the card by the change of the electrostatic capacitance through the card (Paragraph 0127).

As for recognition of the position and direction of the card and the code information, there has been described a method of recognizing the position and direction of the card and the code information by reading a code pattern printed on the card with imaging means beneath the touch panel (Paragraph 0078).

Further, Japanese Unexamined Patent Application Publication No. 2010-187911 suggests that the input operation to the touch panel can be compensated by the result of recognizing the code pattern (Paragraphs 0047, 0052).

Further, Japanese Patent No. 4019114 (Paragraph 0110) and Japanese Unexamined Patent Application Publication No. 2010-187911 (Paragraph 0118) describe a configuration in which a user touches through a card and the touch position on the card is reflected to a game content, or the like.

Beside the above-described techniques, other prior arts regarding a method of recognizing the position, direction, and code information of a card placed on a touch panel will be described.

According to Japanese Patent No. 4043453, there has been described a method, in which a plurality of conductive bodies are provided on a card, and the position, direction, and code information of the card placed on a sensor of an electrostatic capacitance method are recognized by a change of the electrostatic capacitance (Paragraphs 0009, 0010).

According to Japanese Unexamined Patent Application Publication No. 2008-178499, there has been described a method in which the position, direction, and code information of a card is recognized by detecting a plurality of Radio Frequency IDentification (RFID) chips provided on the card using an RFID reader on the lower side of a card table (Paragraphs 0040-0044).

There is no description, in Japanese Patent No. 4043453 and Japanese Unexamined Patent Application Publication No. 2008-178499, about a user touching through a card to perform an input operation.

According to Japanese Unexamined Patent Application Publication No. 2010-61351, there has been described a configuration in which a contact to a touch panel is assessed whether the contact is by a finger or a stylus pen (Paragraph 0057).

Patent Literature 1: Japanese Patent No. 4019114
Patent Literature 2: Japanese Unexamined Patent Application Publication No. 2010-187911
Patent Literature 3: Japanese Patent No. 4043453
Patent Literature 4: Japanese Unexamined Patent Application Publication No. 2008-178499
Patent Literature 5: Japanese Unexamined Patent Application Publication No. 2010-61351

SUMMARY OF THE INVENTION

Problems that the Invention is to Solve

As described above, the inventions of Japanese Patent No. 4019114 and Japanese Unexamined Patent Application Publication No. 2010-187911 achieve some challenges by providing means of recognizing the position, direction and code information of a card, separately from a touch panel.

However, when a card is placed on an information processing device (including a mobile telephone) equipped with a touch panel without such means, the inventions of Japanese Patent No. 4019114 and Japanese Unexamined Patent Application Publication No. 2010-187911 cannot achieve challenges such as (i) inputting information corresponding to the card through the touch panel, or, (ii) by touching on the card, inputting information which is made by combining the position of a finger on the card and information of the card through the touch panel.

Thus, to achieve the above-described challenges, the inventor has invented an information input system and the like as described below.

Means to Solve the Problems

The information input system of the present invention comprises: a touch panel which receives an operation from a user by an electrostatic capacitance method; an information processing unit which uses the touch panel as input means; and a thin-plate medium to be placed on the touch panel, in which the information processing unit implements a first step of recognizing, by means of a predetermined calibration method, medium information comprising code information defined in said medium and a placing position and a placing direction of said medium, and a second step of recognizing coordinate values in a coordinate system of the touch panel for identifying a position touched by a touch operation in which the user touches and/or slides on a surface of said medium.

According to the above feature, by recognizing the position, direction, and code information of a medium placed on the touch panel, the information processing unit can input information corresponding to the medium or input information which is made by combining the position of a finger on the card and the information of the card when the touch panel is touched through the card.

It should be noted that the information processing unit may implement only the first step without implementing the second step.

At the second step, the information processing unit preferably converts coordinate values in the touch panel coordinate system into coordinate values in a coordinate system of the medium for identifying the touch position on the medium surface based on the medium information.

According to the above feature, it is possible to recognize whereabout on the medium surface is touched by a fingertip no matter what position and direction the medium may be placed on the touch panel.

After the second step, the information processing unit preferably implements a third step of implementing processing based on an operation indication associated with the coordinate values in the medium coordinate system by referring to a storage which stores the association.

The operation indication is preferably recognized from a letter and a figure drawn by a user on the medium surface.

The medium is preferably printed with a text and/or an image or a handwriting input area for indicating the touch operation on the medium surface.

The code information preferably define the shape and the size of the medium; and the information processing unit preferably decodes the shape and the size of the medium associated with the code information by referring to the storage.

The predetermined calibration method is preferably a calibration method in which when a user touches at least two predetermined positions on the medium surface or at least two calibration marks provided on the medium surface in a predetermined order, the information processing unit recognizes: a placing position and a placing direction of the medium which are defined by a pattern formed by including the predetermined positions on the medium surface or the touch positions of the calibration marks and the touching order; or the placing position, the placing direction, and code information.

According to the above-described feature, by recognizing the position, direction, and code information of the medium placed on the touch panel with the function of the touch panel itself without using a special device, the information processing unit can input information corresponding to the medium or input information which is made by combining the position of the finger and the information of the card when the touch panel is touched through the card.

The predetermined calibration method is preferably a calibration method in which when the user touches at least three predetermined positions on the medium surface or at least three calibration marks provided on the medium surface, the information processing unit recognizes: a placing position and a placing direction of the medium which are defined by a pattern formed by the predetermined positions on the medium surface or the touch positions of the calibration marks; or the placing position, the placing direction, and the code information.

According to the above-described feature, by recognizing the position, direction, and code information of the medium placed on the touch panel with the function of the touch panel itself without using a special device, the information processing unit can input information corresponding to the medium, or input information which is made by combining the position of the finger and information of the card when the touch panel is touched through the card.

The information processing unit preferably measures elapsed time, with reference to time when the user first touches one of the predetermined positions on the medium or the predetermined calibration marks, until the user touches another one of the predetermined positions on the medium or the predetermined calibration marks next time, and recognizes the code information of the medium by the elapsed time or by a combination of the elapsed time and a pattern formed by including the predetermined positions on the medium surface or the touch positions of the calibration marks and the touching order.

The predetermined calibration method is preferably a calibration method in which when the user draws a text and/or an image on the medium, the information processing unit recognizes the placing position and the placing direction of the medium, which are defined by the text and/or the image, or the placing position, the placing direction and the code information.

The predetermined calibration method preferably also works as user authentication of the medium.

The calibration marks are preferably indicated to the user as a text and/or an image of a number, a letter, a symbol, an icon, and the like printed on the medium surface.

The predetermined positions of the medium surface are preferably positions near corners of the medium or positions near a periphery of the medium.

The predetermined positions of the medium surface are preferably positions indicated to the user by holes and/or notch portions provided on the medium surface.

The placing surface of the medium is preferably provided with antiskid material or adhesive.

The medium is preferably a card shape or a coin shape.

The first step of the information processing unit preferably further activates an application and/or a content associated with the code information, and controls execution of the application and/or the content according to the touch operation in which the user touches and/or slides on the medium.

The information input system further preferably comprises: an information processing device which activates an application and/or a content associated with the code information, and controls execution of the application and/or the content according to the touch operation in which the user touches and/or slides on the medium.

The information processing unit preferably recognizes the code information, instead of the predetermined calibration method, with an Radio Frequency IDentification (RFID) which is provided at a predetermined position on the medium and records the code information and an RFID reader which reads information recorded in the RFID.

The information input system preferably comprises: an optical reading unit which captures an image of an operation surface of the touch panel; and an analysis unit which analyzes the captured image, in which the information processing unit, instead of the predetermined calibration method, recognizes the code information by recognizing a shape, a size, and a placing position of the medium by an outline of the medium placed on the touch panel and/or causing the analysis unit to analyze an image printed on the medium surface.

The medium is preferably printed with a dot pattern which defines the code information according to a predetermined algorithm and is readable using light of a predetermined wavelength, and the information processing unit recognizes the code information by causing the optical reading unit to read the dot pattern by capturing only the light of the predetermined wavelength and causing the analysis unit to analyze the dot pattern.

The medium preferably comprises a conductive body on a surface facing the touch panel or at a predetermined position inside the medium, and the information processing unit recognizes the medium information by sensing a difference in a number of the conductive bodies and arranged positions thereof, or a difference in amount of electrostatic capacitance of each conductive body.

The conductive body is preferably formed by punctiform conductive bodies and a linear conductive body which connects the punctiform conductive bodies.

The medium has: a touch layer to be touched by a finger of the user; and a conductive body which is electrically connected with the conductive body contacting the touch.

The conductive body preferably has different electrostatic capacitance characteristics from that of the fingertip of the user who touches the touch panel surface or the medium surface placed on the touch panel surface, and the information processing unit distinguishes the difference in the electrostatic capacitance characteristics.

The information processing unit, instead of the predetermined calibration method, preferably recognizes the code information of the medium by the RFID and the RFID reader according to claim 18, and recognizes the placing position and the placing direction of the medium by arranged positions of the conductive bodies according to claim 21.

The information input system of the present invention comprises: a touch panel which accepts an operation of a user by an electrostatic capacitance method; an information processing unit which uses the touch panel as input means; and a thin-plate medium to be placed on the touch panel, in which the information processing unit implements processing of recognizing, by means of a predetermined calibration method, medium information which comprises code information defined in the medium and a placing position and a placing direction of the medium.

The program of the present invention is executed by an information processing unit which comprises a touch panel of an electrostatic capacitance method as input means, in which a thin-plate medium is to be placed on the touch panel, and the program causes the information processing unit to implement: a first step of identifying, by means of a predetermined calibration method, medium information comprising code information defined in said medium and a placing position and a placing direction of said medium; and a second step of identifying coordinate values in a coordinate system of the touch panel for identifying a position touched by a touch operation in which a user touches and/or slides on said medium surface.

The program of the present invention is executed by an information processing unit which comprises a touch panel of an electrostatic capacitance method as input means, in which a thin-plate medium is to be placed on the touch panel, and the program causes the information processing unit to implement processing of recognizing, by means of a predetermined calibration method, medium information comprising code information defined in the medium and a placing position and a placing direction of said medium.

The medium of the present invention is to be placed on a touch panel of an electrostatic capacitance method, and the touch panel comprises input means of an information processing unit, in which the medium is printed with an image and/or a text which indicates an operation to be carried out by a user for the information processing unit to recognize a placing position, a placing direction of the medium on the touch panel and code information thereof.

The medium is preferably aluminum foil or conductive paper.

The medium preferably includes carbon.

The medium is preferably formed by weaving conductive thread.

The information input system of the present invention comprises: a touch panel which accepts an operation from a user by an electrostatic capacitance method; an information processing unit which uses the touch panel as input means; a thin-plate medium to be placed on the touch panel, in which part or whole of the thin-plate medium is conductive body, a touch layer to be touched by a fingertip of a user and the conductive body contacting the touch panel are integrally formed, and the information processing unit recognizes the medium information by sensing a difference in a shape, an arrangement, or an amount of electrostatic capacitance of the conductive body formed on a surface contacting the touch panel.

According to the above-described feature, the medium information can be recognized without calibration by a user, which enhances convenience.

The information input system preferably further comprises: an information processing device, in which the information processing device activates an application and/or a content associated with the medium information, and controls execution of the application and/or the content by a touch operation in which the user touches and/or slides on the medium surface.

The conductive body is preferably formed in a planar fashion in the touch layer of the medium, while the conductive bodies are arranged as dots at a plurality of points on the surface contacting the touch panel.

The medium is preferably formed by the conductive body having a first characteristic, and the conductive bodies having a second characteristic are arranged as dots in an area contacting the touch panel.

A stylus pen is preferably used to touch, instead of the finger of the user.

Preferably, the medium of the invention is to be placed on a touch panel of an electrostatic capacitance method, and the touch panel comprises input means of an information processing unit, in which the medium is printed with an image and/or a text for indicating an operation of touching the medium by a fingertip of a user, part or whole of the thin-plate medium is conductive body, a touch layer to be touched by the finger of the user and the conductive body to contact the touch panel are integrally formed, and the information processing unit recognizes the medium information and the placing position and the placing direction of the medium on the touch panel by sensing a difference in a shape, an arrangement, or an amount of electrostatic capacitance of the conductive bodies, and causes the information processing device to activate an application and/or a content associated with the medium information, and controls execution of the application and/or the content by a touch operation in which the user touches and/or slides on the medium surface.

The conductive body is preferably aluminum foil or conductive paper.

The conductive body preferably includes carbon.

The conductive body is preferably formed by weaving conductive thread.

The placing surface of the medium is preferably provided with antiskid material or adhesive.

The medium is preferably a card shape or a coin shape.

The conductive body is preferably formed in a planar fashion in the touch layer of the medium, while the conductive bodies are arranged as dots at a plurality of points on the surface contacting the touch panel.

The medium is preferably formed by the conductive body having a first characteristic, and the conductive bodies having a second characteristic are arranged as dots in an area contacting the touch panel.

A stylus pen is preferably used to touch, instead of the finger of the user.

Advantageous Effect of the Invention

According to the present invention, in an information processing device (including a mobile telephone) equipped with a touch panel, when a card is placed on the touch panel, the position, direction, and code information of the card are input through the touch panel, and further, when the touch panel is touched through the card, information which is made by combining the position of the finger and the information of the card is input, which are effects provided in the present invention, yet not attained from the prior techniques.

BRIEF DESCRIPTION OF THE DRAWINGS

FIGS. 4A and 4B are diagrams showing a configuration of the touch panel 101 (3);

FIG. 34A is a plane view and FIG. 34B is a section view;

FIG. 35A is a plane view and FIG. 35B is a section view;

FIG. 36A is a case in which part of the medium is formed by weaving conductive thread, and FIG. 36B is a case in which the whole of the medium is formed by weaving conductive thread;

FIG. 37A is a plane view, and FIG. 37B is a section view;

FIG. 38A is a plane view, and FIG. 38B is a section view.

DETAILED DESCRIPTION OF PREFERRED EMBODIMENTS

The embodiments of the present invention will be described.

<Hardware Configuration>

The information input system of the present invention comprises: a touch panel 101; a medium 201 to be placed on the touch panel; and an information processing unit 301. The specific configuration of the hardware will be described below.

Figure 1:
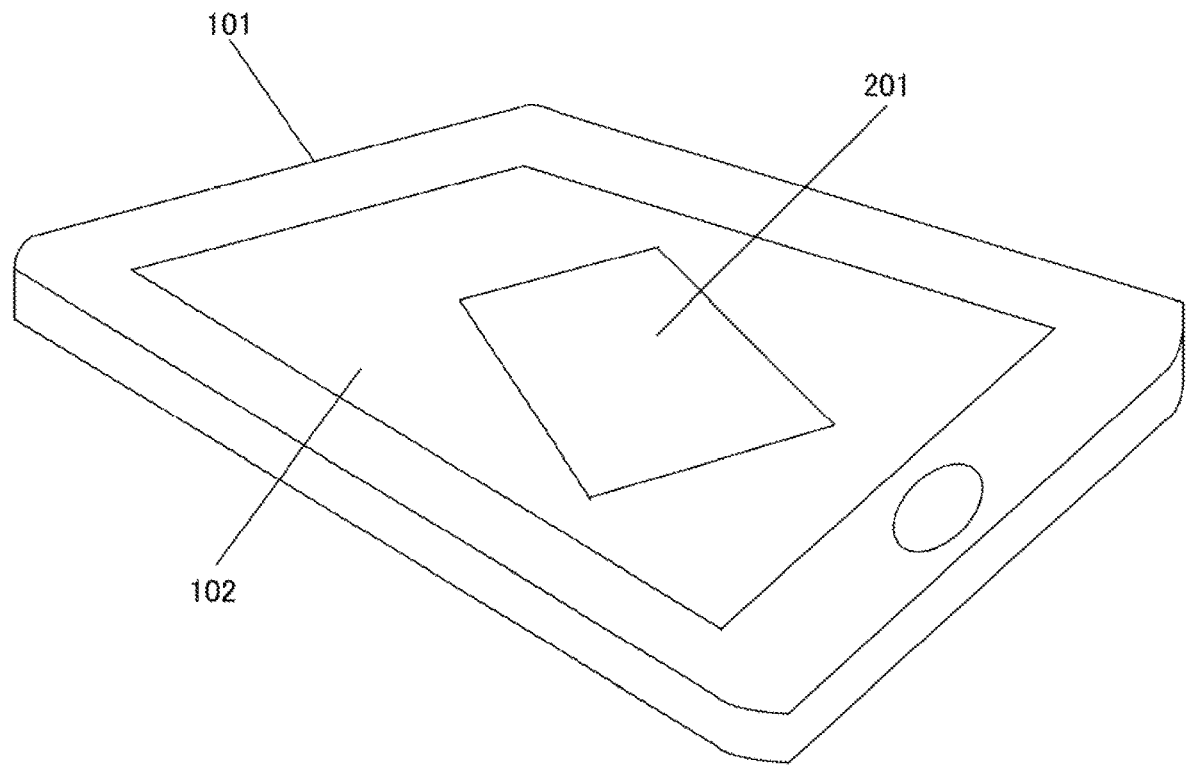
FIG. 1 is a diagram showing a representative example of the present invention.

A preferred embodiment intended by the inventor is a tablet computer as shown in FIG. 1 which incorporates all hardware configuring the present invention.

Figure 2:
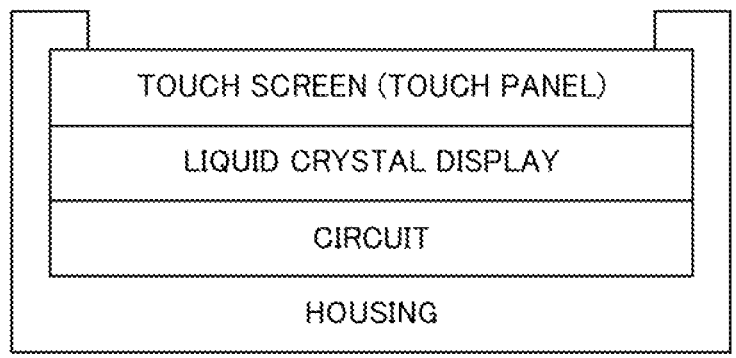
FIG. 2 is a diagram showing a configuration of the touch panel 101 (1)
Figure 3:
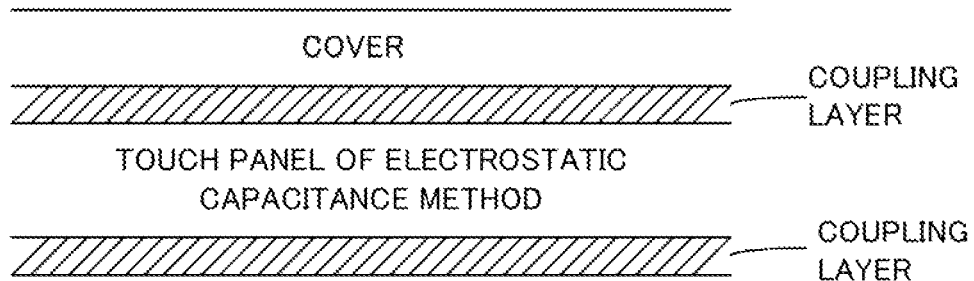
FIG. 3 is a diagram showing a configuration of the touch panel 101 (2)
Figure 5:
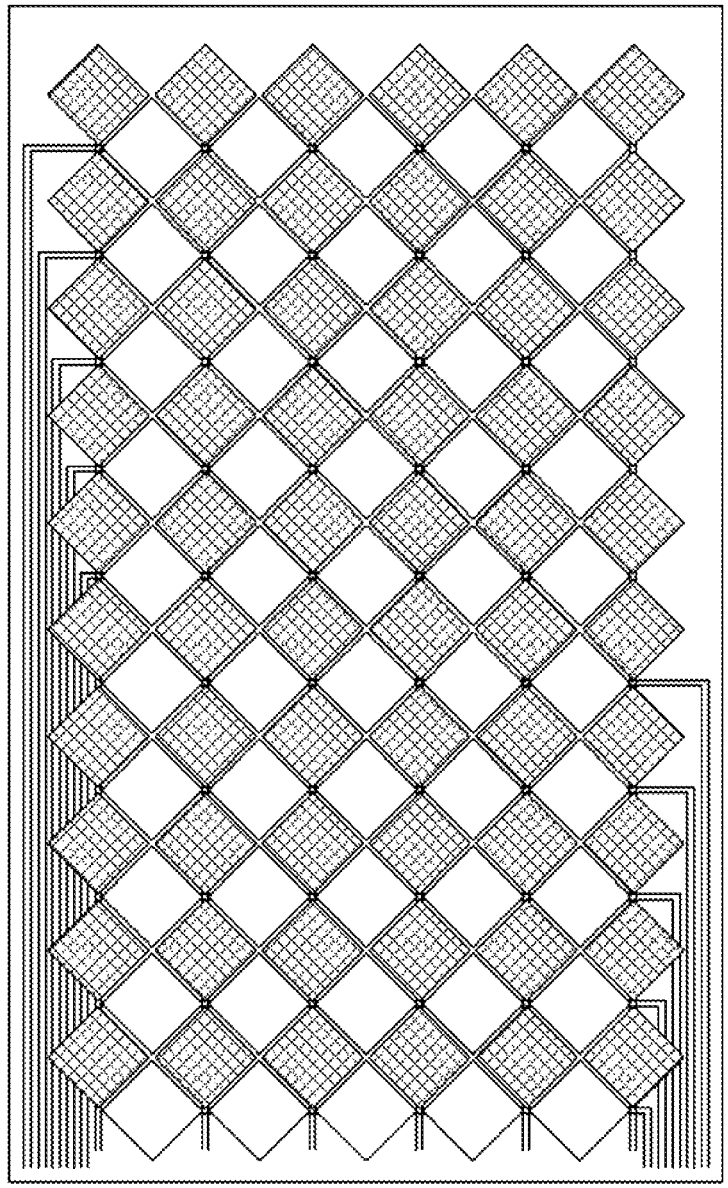
FIG. 5 is a diagram showing a configuration of the touch panel 101 (4)

As shown in the section view of FIG. 2, a display unit 102 is provided underneath the touch panel 101, and, further, an information processing unit 301, not shown, is provided. In this example, all the information processing described below will be carried out by the information processing unit 301 in the tablet computer. Other representative structures of the touch panel will be shown in FIG. 3 to FIG. 5.

It should be noted that part or whole of the touch panel 101, display unit 102, and information processing unit 301 may be provided as a separate device. While not shown in the drawings, the touch panel 101 can be considered to be used in a variety of utility forms such as an interface device or a thin client terminal of personal computers (PC), audio visual equipment, mobile telephones, information terminals, game machines, educational materials, shopping terminals, advertisement terminals, machine tools, printing machines, and the like.

Further, the information processing unit 301 acquires, as necessarily, information which is stored in a storage which is not shown. The storage refers to both the one provided in the same device as the information processing unit 301 and the one provided outside the device.

<Overview>

A medium 201 is placed on the touch panel 101. In the present invention, a variety of information is input by a user by touching this medium 201 with a fingertip.

Figure 6:
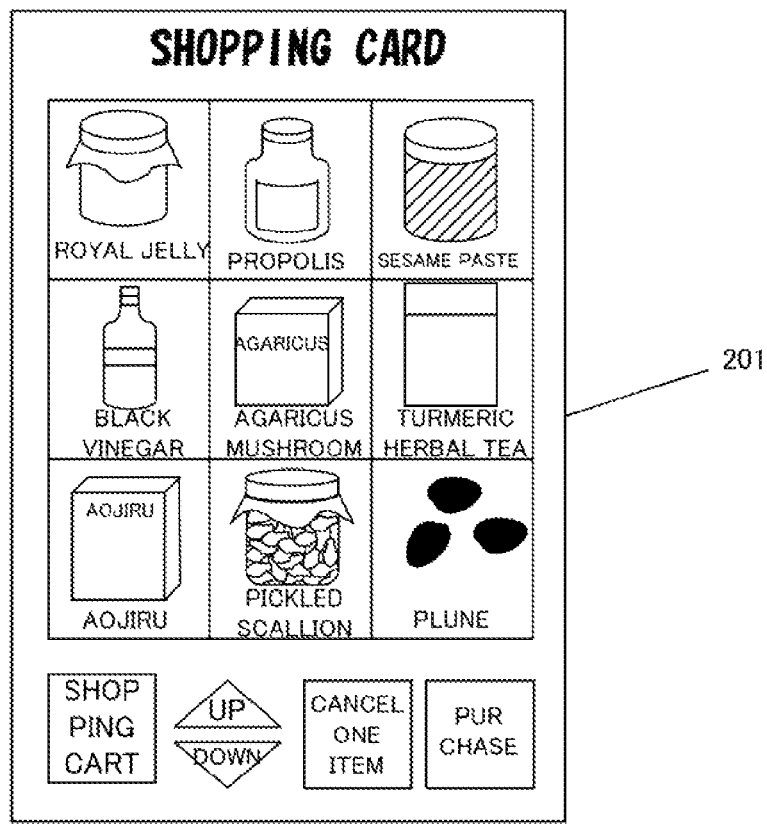
FIG. 6 is a diagram showing an example of the medium 201 (1)
Figure 7:
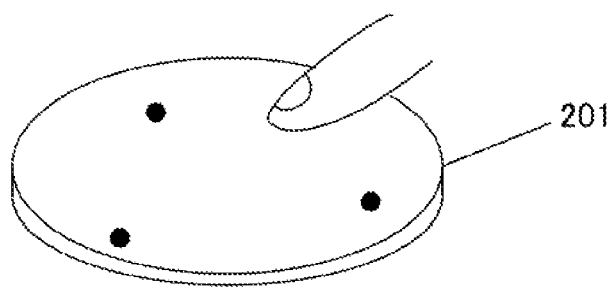
FIG. 7 is a diagram showing an example of the medium 201 (2)

While the medium 201 is a rectangular card shape in the example of FIG. 6, the shape may be other shapes than a rectangle including a coin shape (refer to FIG. 7). The material is not restricted to paper yet may be synthetic resin or the like.

Other specific products include stickers, sheets, note pads, bookmarks, and the like. The specific shape of the medium 201 is a design matter of those skilled in the art, and the details are not described herein.

When touching the medium 201, a user does not always have to use a "fingertip." Alternatively, a user may have a stylus pen (not shown) in hand and touch with the stylus pen. This is a design matter of those skilled in the art, and the details are not described herein <Calibration Method>

As the most characteristic configuration of the present invention, there will be described a method in which the information processing unit 301 recognizes the position, direction, and code information of a medium 201 (medium information) when the medium 201 is placed on the touch panel 101.

The code information has a role as identification (ID) for identifying each of a plurality of mediums 201, as well as, it can define the shape of the medium 201 and the size of the medium 201.

In the present invention, when a user touches the medium 201 placed on the touch panel 101, the information processing unit 301 recognizes the position, direction, and code information of the medium.

This operation is hereinafter referred to as "calibration." The calibration has a plurality of methods, and which calibration method to be employed is arbitrarily determined.

All the calibration methods commonly require a user to touch positions on the medium 201, which are indicated by predetermined positions (refer to FIG. 8) of a plurality of calibration marks 401, texts, photographs, images (graphics), and the like. It will be appreciated that the touch positions are not necessarily visually indicated, and may be predefined corners of the medium or predetermined positions of the frame.

There are methods which have a predefined touch order, and methods which do not define the order. The first to third calibration methods are methods which predefine the touch order, while the fourth and fifth calibration methods are methods which do not define the touch order.

Further, as the sixth calibration method, instead of a touch operation by a user, there is a method in which the information processing unit 301 recognizes the position, direction, and code information of the medium 201 when the user trails the finger on the medium surface.

<Calibration Method with Defined Touch Order>

The calibration methods which have a predefine touch order will be described.

<First Calibration>

The first calibration method will be described.

Figure 8:
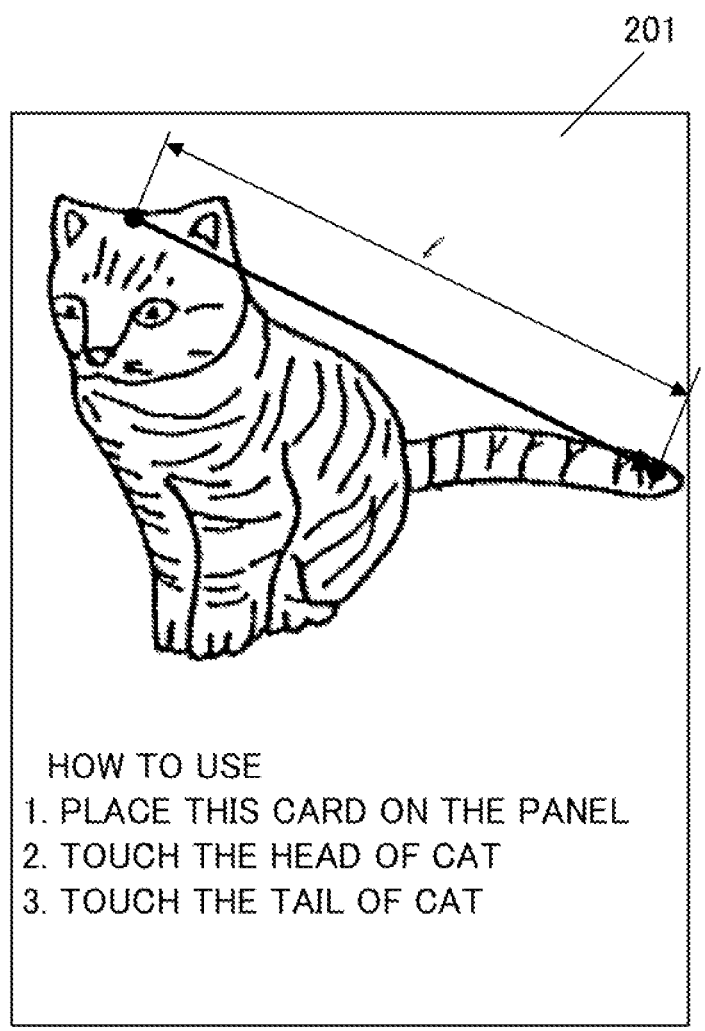
FIG. 8 is a diagram showing an example of the medium 201 (3)
Figure 9:
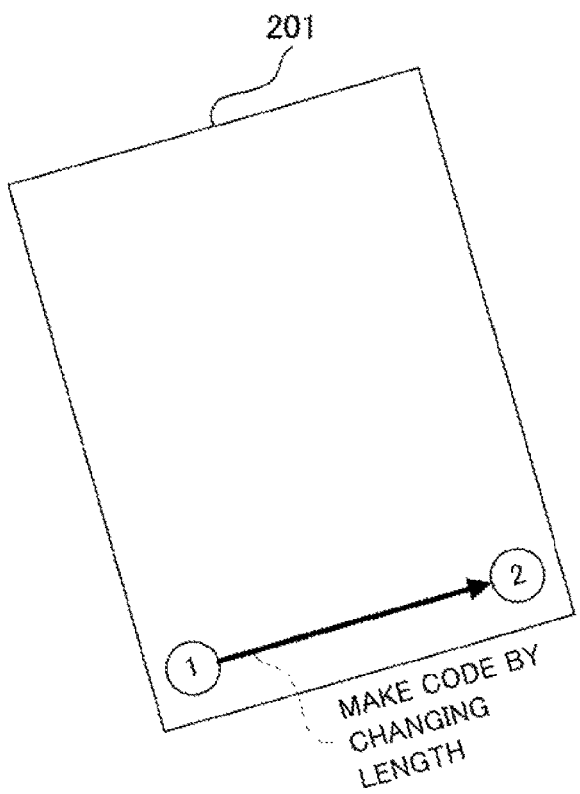
FIG. 9 is a diagram showing a first calibration method.

As shown in FIG. 9, a user touches the medium according to the positions and order indicated by the two calibration marks 401 printed on the medium 201. It should be noted that, instead of the calibration marks 401, the positions may be positions indicated by other predetermined method (refer to FIG. 8).

Then, two values of coordinates (coordinate values) in the touch panel coordinate system are input.

The position of the medium 201 is specified by the coordinate value which has been input first as a representative point. It should be noted that the coordinate value which has been secondly input may be defined as a representative point.

The direction of the medium 201 is specified by the direction of the line segment connecting the coordinate which has been input first and the coordinate which has been input second. For example, the direction of the medium 201 may be arbitrarily defined by the direction which connects from the first point to the second point, or the direction which connects from the first point to the second point.

The code information is identified by referring the code information associated with the length of a line segment connecting the coordinate which has been input first and the coordinate which has been input second in the code information table stored in the storage. Alternatively, a time interval between touching the first point and touching the second point may be defined as the code information. Further, code information obtained from the length of the line segment may be added to the code information.

<Second Calibration>

The second calibration will be described.

Figure 10:
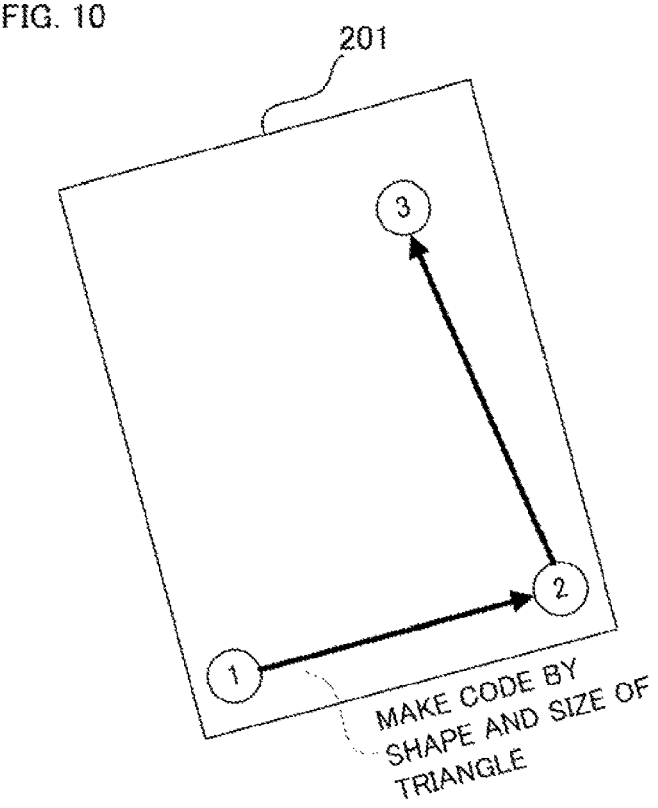
FIG. 10 is a diagram showing a second calibration method (1)

As shown in FIG. 10, a user touches the medium 201 according to the positions and the order indicated by the three calibration marks 401 printed on the medium 201. It should be noted that, instead of the calibration marks 401, the touch positions may be positions indicated by other predetermined method.

Then, three values of coordinates (coordinate values) in the touch panel coordinate system are input.

The position of the medium 201 is specified by the coordinate value which has been input first as a representative point. It should be noted that the coordinate value which has been input second or third may also be defined as the representative point.

The direction of the medium 201 can be specified by the direction of a line segment connecting the coordinate which has been input first and the coordinate which has been input second. For example, the direction of the medium 201 may be defined arbitrarily based on the direction connecting from the first point to the second point or the direction connecting from the first point to the second point. It will be appreciated that the direction of the medium 201 may be specified by a combination of other two points.

Figure 11:
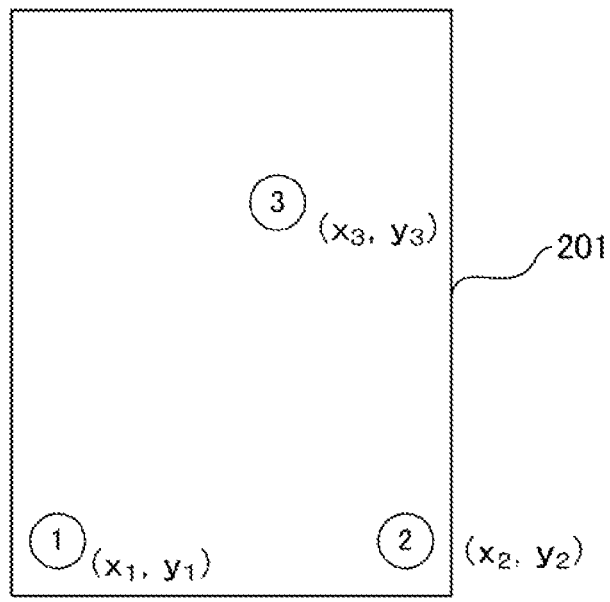
FIG. 11 is a diagram showing the second calibration method (2)
Figure 12:
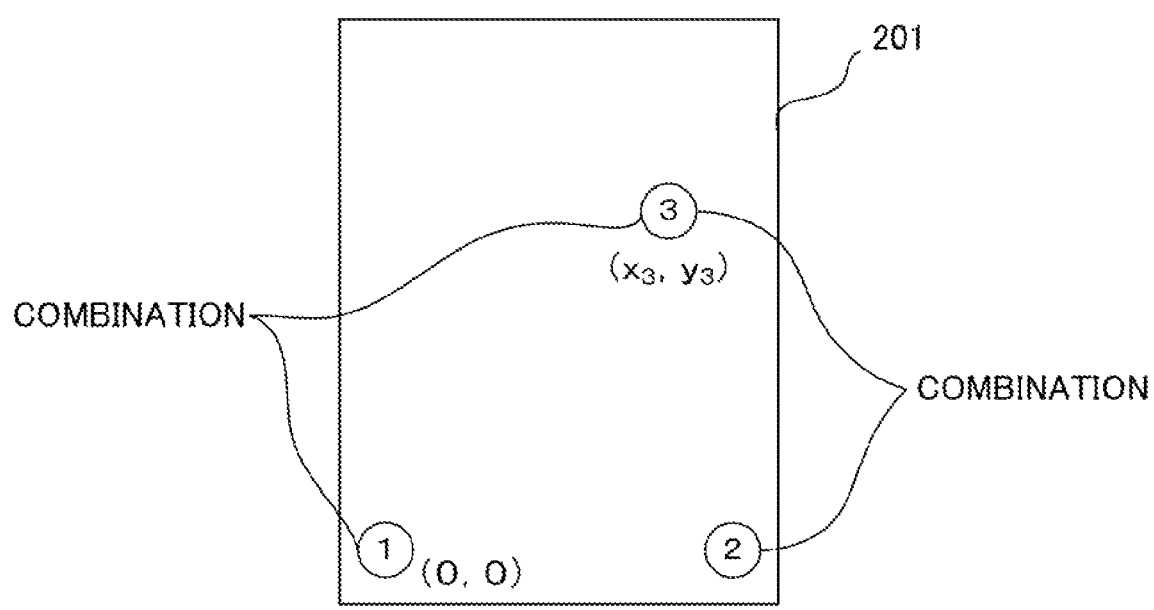
FIG. 12 is a diagram showing the second calibration method (3)

The code information is specified by a point where the third point is relatively arranged with reference to the coordinates of the first and second points (refer to FIG. 11). It should be noted that the relative coordinate of the third point may be calculated with reference to the coordinate of the first or second point as the origin (refer to FIG. 12), and code information associated with the relative coordinate may be referred to in the code information table stored in the storage to specify the code information. Further, the code information associated with the shape or the size of a triangle made by connecting the input three coordinates or the combination thereof may be referred to in the code information table stored in the storage to specify the code information. Also, a time interval when touching the three points may be defined as the code information. Further, code information calculated from the touched coordinates may be added to the code information.

<Third Calibration>

The third calibration method will be described.

Figure 13:
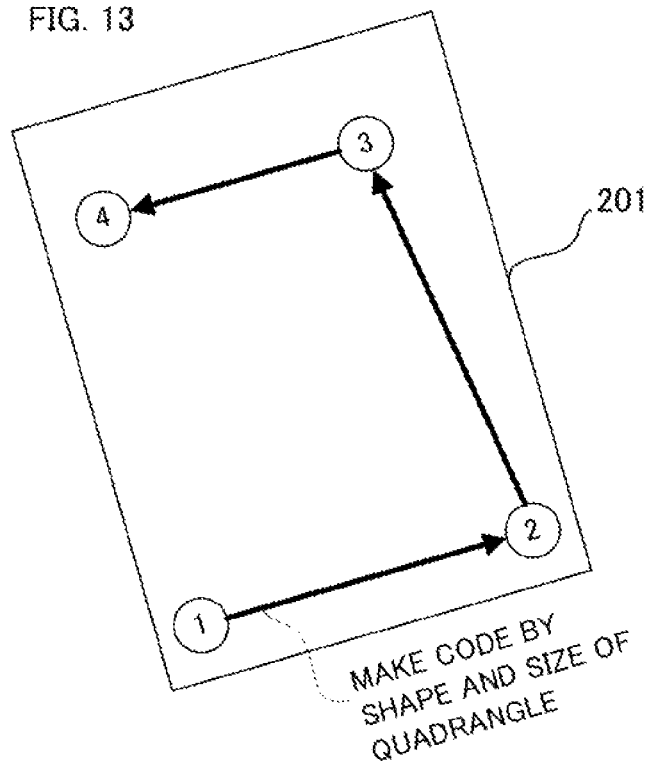
FIG. 13 is a diagram showing a third calibration method (1)

As shown in FIG. 13, a user touches the medium 201 according to the positions and order indicated by four calibration marks 401 printed on the medium 201. It should be noted that, instead of the calibration marks 401, positions indicated by other predetermined method may be used.

Then, four values of coordinates (coordinate values) in the touch panel coordinate system can be input.

The position of the medium 201 is specified by the coordinate value which has been input first as a representative point. However, a point which has been input second, third, or fourth may also be defined as a representative point.

The direction of the medium 201 is specified by the direction of a line segment connecting the coordinate which has been input first and the coordinate which has been input second. For example, the direction of the medium 201 can be arbitrarily defined from the direction which connects from the first point to the second point or the direction which connects from the first point to the second point. It will be appreciated that the direction of the medium 201 can be specified by a combination of other two points.

Figure 14:
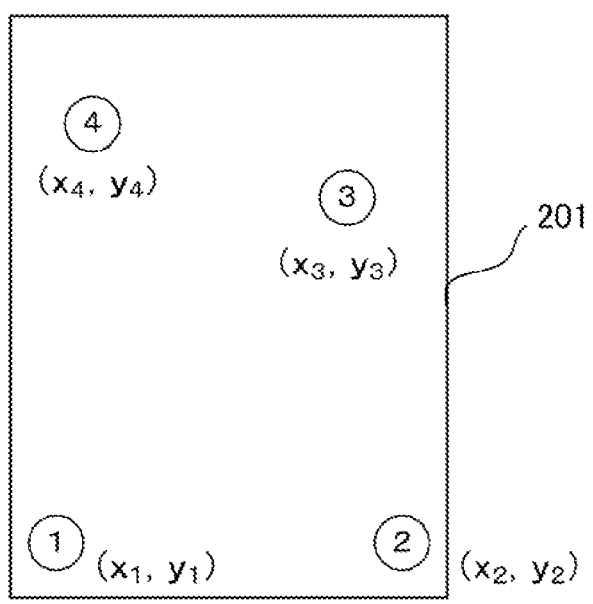
FIG. 14 is a diagram showing the third calibration method (2)
Figure 15:
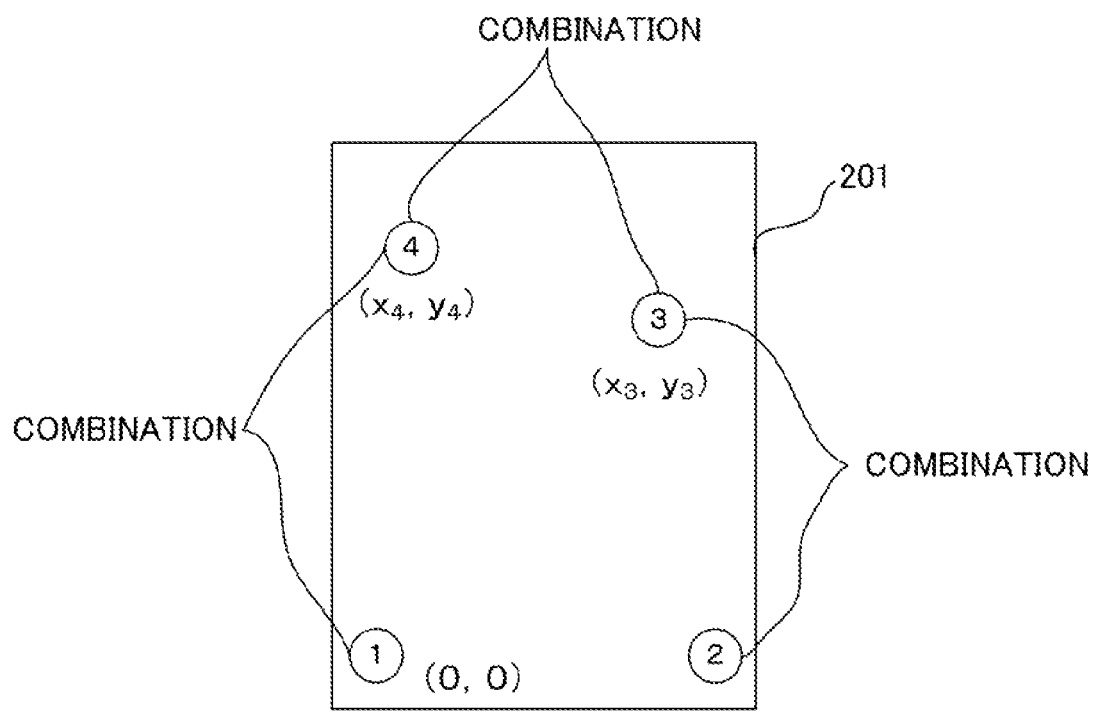
FIG. 15 is a diagram showing the third calibration method (3)

The code information is specified by points where the third and fourth points are relatively arranged with reference to the coordinates of the first and second points (refer to FIG. 14). It should be noted that the relative coordinates of the third and fourth points may be calculated with reference to the coordinate of the first or second points as the origin (refer to FIG. 15), and code information associated with the relative coordinates may be referred to in the code information table stored in the storage to specify the code information. Further, the code information associated with the shape or the size of a quadrangle made by connecting the input four coordinates or the combination thereof may be referred to in the code information table stored in the storage to specify the code information. Also, a time interval when touching the four points may be defined as the code information. Further, code information calculated from the touched coordinates may added to the code information.

It will be appreciated that a greater volume of code information is further specified by making the same processing for calibration with more than four touch indications.

<Calibration Method with Undefined Touch Order>
<Fourth Calibration>

The fourth calibration method will be described.

Figure 16:
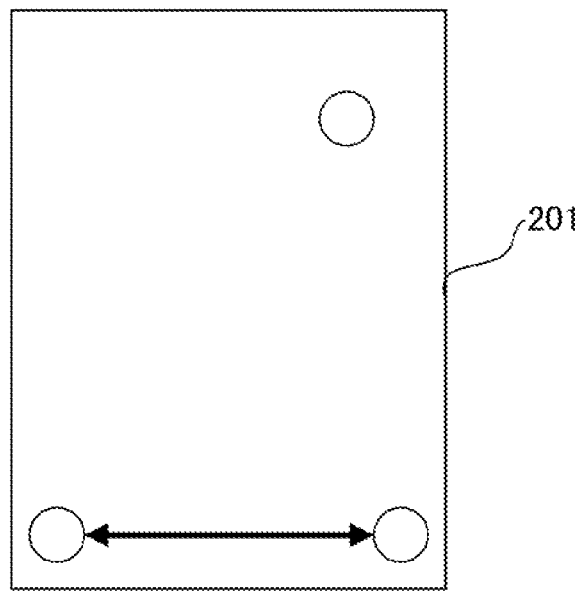
FIG. 16 is a diagram showing a fourth calibration method (1)

As shown in FIG. 16, a user touches the medium 201 according to the positions and order indicated by three calibration marks 401 printed on the medium 201. The order of touching the medium 201 is arbitrarily determined, or the calibration marks 401 may be simultaneously touched. It should be noted that, instead of the calibration marks 401, positions indicated by other predetermined method may also be used.

Then, three values of coordinates (coordinate values) in the touch panel coordinate system are input.

The position of the medium 201 is specified by forming a triangle shape which is configured by connecting the input three coordinates so that all the three vertexes can be specified and defining one of the points as a representative point. It should be noted that, if the triangle is an equilateral triangle, which vertex to make the representative point cannot be specified.

The direction of the medium 201 is defined by the direction connecting from the first reference point to the second reference point by defining the representative point as the first reference point and any one of other vertexes as the second reference point. Further, the direction of the medium 201 can be arbitrarily defined from the direction connecting from the first reference point to the second reference point.

Figure 17:
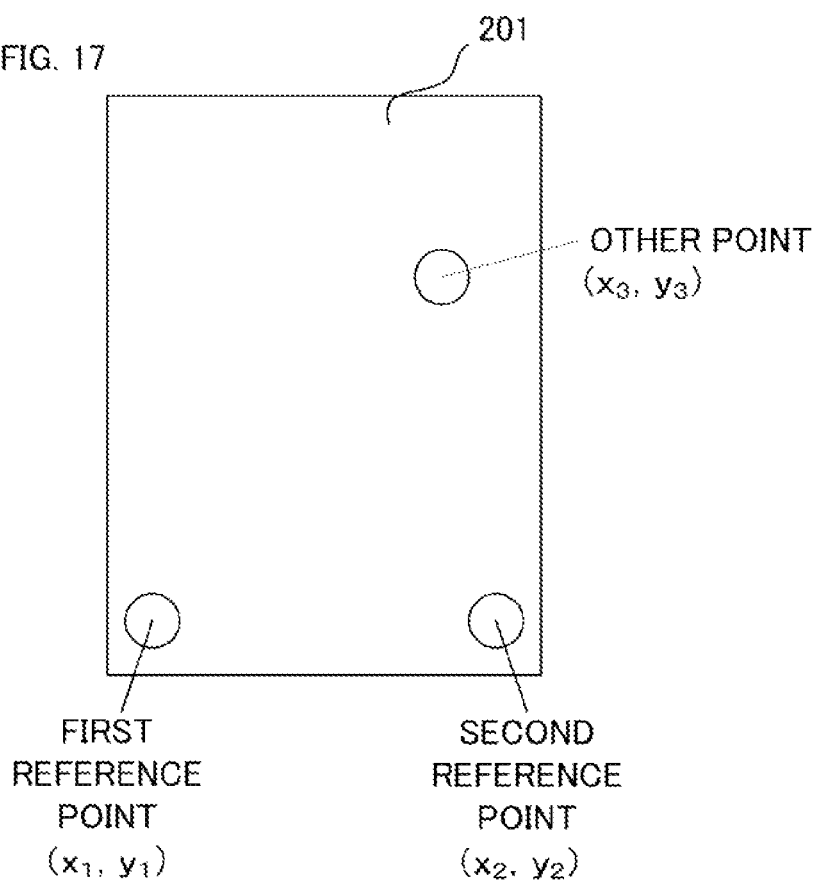
FIG. 17 is a diagram showing the fourth calibration method (2)
Figure 18:
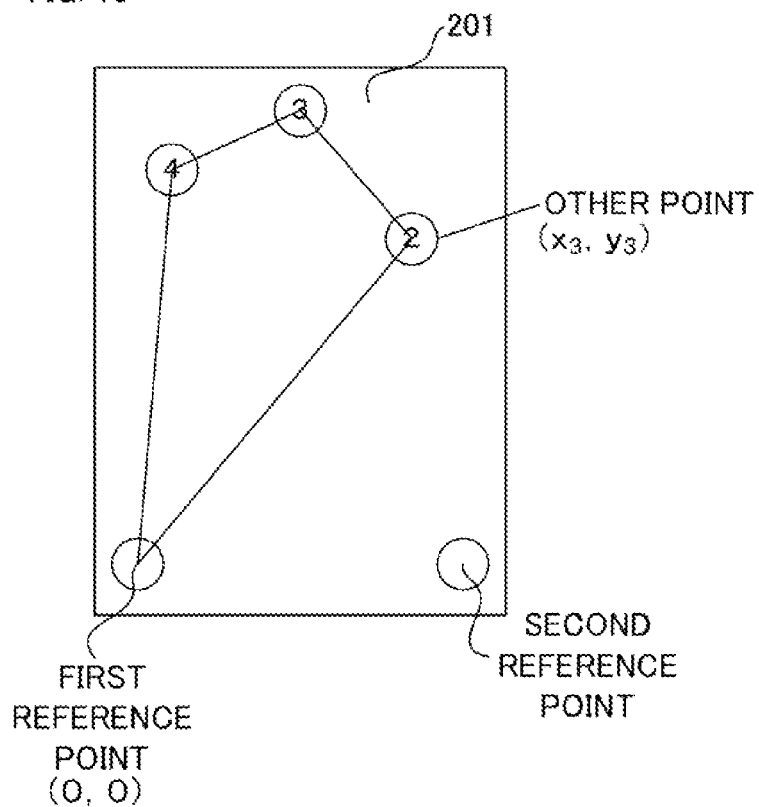
FIG. 18 is a diagram showing the fourth calibration method (3)

The code information is specified by a point where another point is relatively arranged with reference to the coordinates of the first and second points (refer to FIG. 17). It should be noted that the relative coordinate of the other point may be calculated with reference to the coordinate of the first reference point as the origin (refer to FIG. 18), and code information associated with the relative coordinate may be referred to in the code information table stored in the storage to specify the code information. Further, the code information associated with the shape or the size of a triangle made by connecting the input three coordinates or the combination thereof may be referred to in the code information table stored in the storage to specify the code information. Also, a time interval when touching the three points may be defined as the code information. Further, code information calculated from the touched coordinates may be added to the code information.

<Fifth Calibration Method>

The fifth calibration method will be described.

Figure 19:
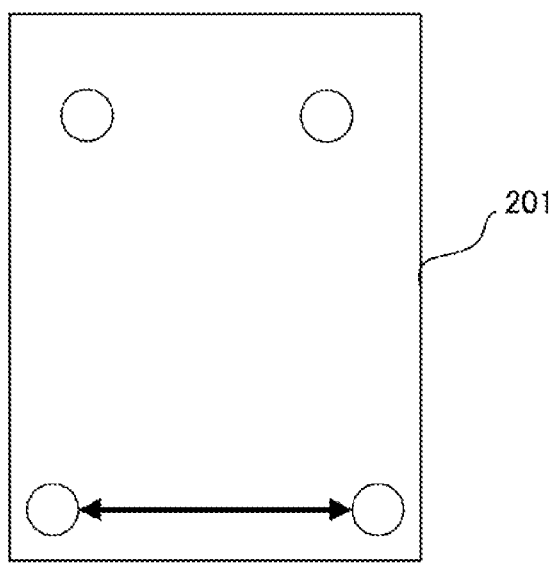
FIG. 19 is a diagram showing a fifth calibration method (1)

As shown in FIG. 19, a user touches the medium 201 according to the positions and order indicated by four calibration marks 401 printed on the medium 201. The order of touching the medium 201 is arbitrary, or the calibration marks 401 may be simultaneously touched. It should be noted that, instead of the calibration marks 401, positions indicated by other predetermined method may also be used.

Then, four values of coordinates (coordinate values) in the touch panel coordinate system are input.

The position of the medium 201 is specified by forming a quadrangular shape which is configured by connecting the input four coordinates so that all the four vertexes can be specified and defining one of the points as a representative point. It should be noted that, if the quadrangle is line-symmetric or point-symmetric such as a regular tetragon, a rectangle, a parallelogram, which vertex to make the representative point cannot be specified.

The direction of the medium 201 is specified by a direction connecting from the first reference point to the second reference point by defining the first reference point as the representative point and the second reference point as any one of other vertexes. Further, the direction of the medium 201 can be arbitrarily defined by a direction connecting from the first reference point to the second reference point.

Figure 20:
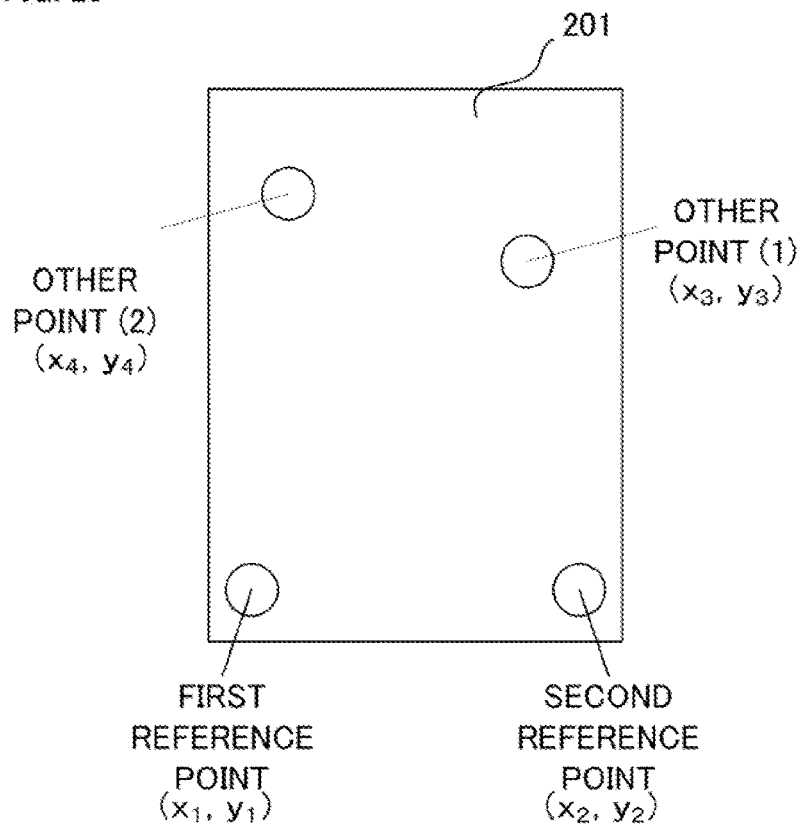
FIG. 20 is a diagram showing the fifth calibration method (2)
Figure 21:
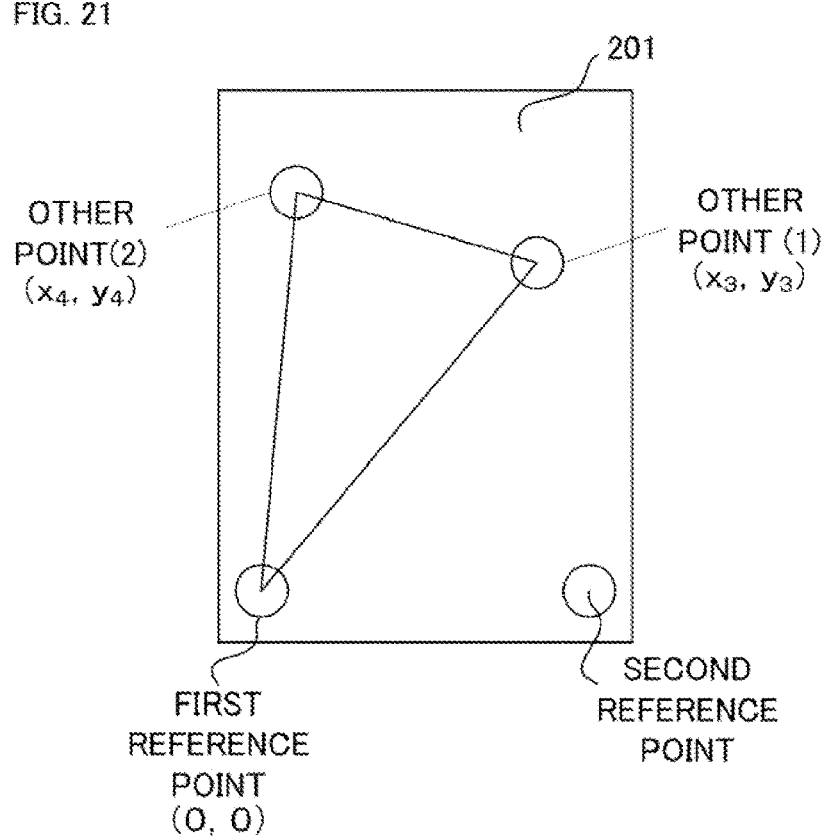
FIG. 21 is a diagram showing the fifth calibration method (3)

The code information is specified by where other two points are relatively arranged with reference to the coordinates of the first and second reference points (refer to FIG. 20). It should be noted that the relative coordinates of the other two points may be calculated with reference to the coordinate of the first reference point as the origin (refer to FIG. 21), and code information associated with the relative coordinates may be referred to in the code information table stored in the storage to specify the code information. Further, the code information associated with the shape or the size of a quadrangle made by connecting the input four coordinates or a combination thereof may be referred to in the code information table stored in the storage to specify the code information. Also, a time interval when touching the four points may be defined as the code information. Further, code information calculated from the touched coordinates may be added to the code information.

It goes without saying that a greater volume of code information can be defined by making the same processing for calibration with more than four touch indications.

<Sixth Calibration Method>

The sixth calibration method will be described.

Figure 22:
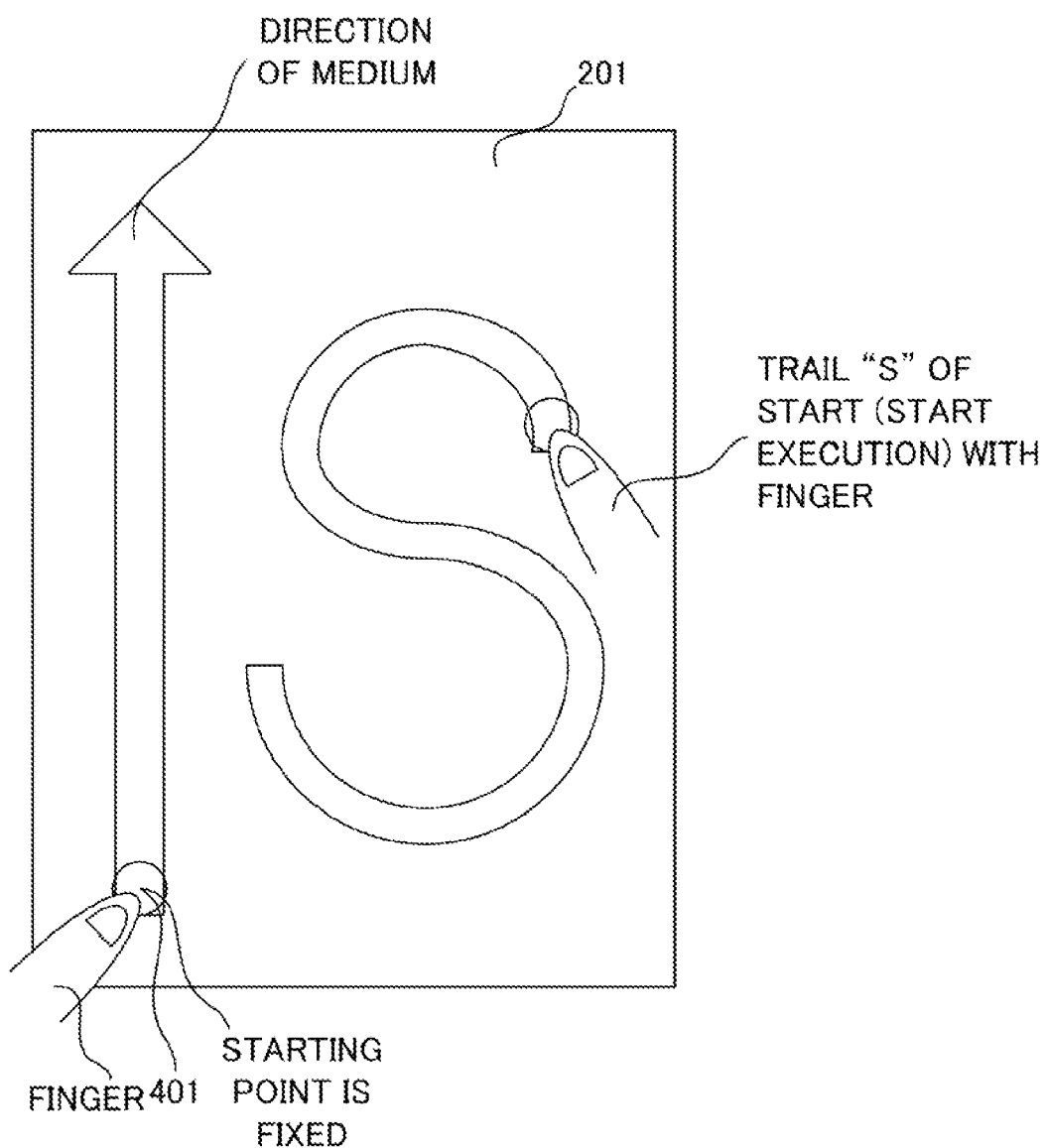
FIG. 22 is a diagram showing a sixth calibration method.

As shown in FIG. 22, a user trails the finger on the medium 201 according to the image of an arrow on the medium 201. Then, the image drawn by trailing user's finger is input. It will be appreciated that the direction of the medium may be input by touching a starting point and then an arbitrary position from the starting point without trailing the finger.

The position of the medium 201 is specified by defining the coordinate value of a position where the user first touches the medium 201 and starts trailing the finger as a representative point. It should be noted that the coordinate value of a position where the user finished trailing the finger on the medium 201 may also be defined as a representative point, or a predetermined coordinate value on the trajectory which the user trailed the finger on the medium 201 may be defined as a representative point.

The direction of the medium 201 is specified by the direction in which the user has moved the finger. In FIG. 22, the medium 201 is recognized as oriented in the direction of the arrow by moving the finger in the direction indicated by the arrow. Therefore, a calibration mark 401 is required to be provided at the starting point of the arrow on the medium 201 to indicate to the user the starting point. The calibration mark 401 indicating this starting point may be provided within a handwriting input area.

The code information of the medium 201 is specified by referring to the code information associated with the image input in the handwriting input area in the code information table stored in the storage.

An image input operation for specifying the position and direction of the medium 201 and an image input operation for inputting code information of the medium 201 preferably input different images respectively.

<Method of Converting from the Touch Panel Coordinate System into the Medium Coordinate System>

Figure 23:
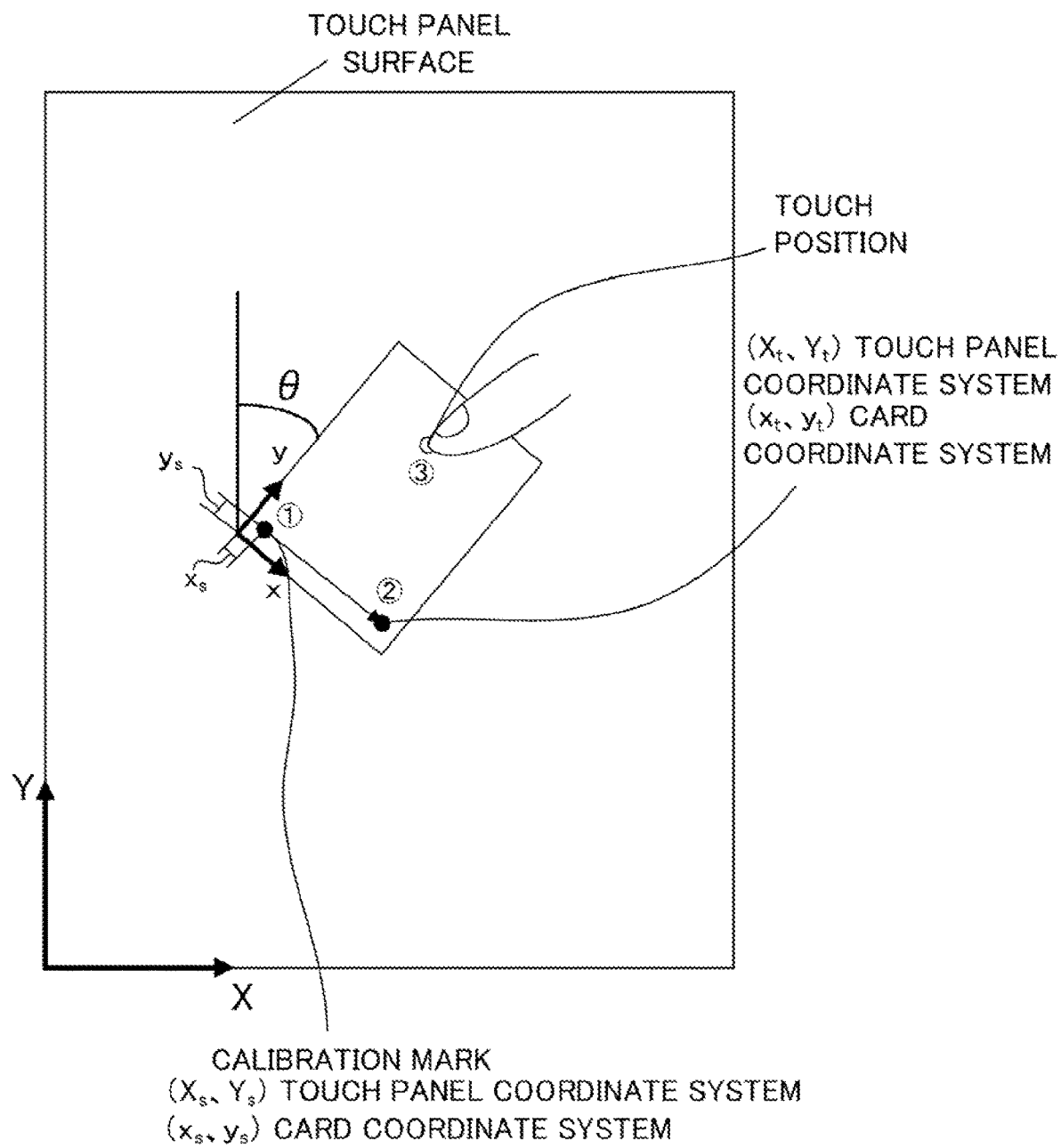
FIG. 23 is a diagram showing a method for converting the touch panel coordinate system into the medium coordinate system.

A method of converting coordinate values in the touch panel coordinate system into coordinates in the medium coordinate system will be described with reference to FIG. 23.

The coordinate value in the touch panel coordinate system input as a representative point upon the above-described calibration is defined as ($X_s$, $Y_s$).

Further, the coordinate value in the medium coordinate system which expresses the coordinate values input as the representative point in the touch panel coordinate system upon the calibration is defined as ($x_s$, $y_s$).

Meanwhile, the angle made by a Y direction in the coordinate system of the touch panel and a y direction in the coordinate system of the medium is defined as θ.

Here, the touch position of user's finger is defined as ($X_t$, $Y_t$) as expressed in the touch panel coordinate system.

In this case, the touch position ($x_t$, $y_t$) in the medium coordinate system is expressed by the following formula, where α is a ratio of a unit length in the medium coordinate system to a unit length in the touch panel coordinate system.

$$\begin{Bmatrix} x_t \\ y_t \end{Bmatrix} = \begin{Bmatrix} x_s \\ y_s \end{Bmatrix} + \alpha \begin{Bmatrix} \cos\theta & \sin\theta \\ -\sin\theta & \cos\theta \end{Bmatrix} \begin{Bmatrix} X_t - X_s \\ Y_t - Y_s \end{Bmatrix}$$ [Mathematical 1]

Performing such arithmetic processing, no matter which position and direction the medium 201 may be arranged on the touch panel 101, the part printed on the surface of the medium 201 which was touched by the fingertip can be recognized.

<Information Processing Unit and Application>

The following will describe an application (a program) which is executed by the information processing unit 301 which is one of the constituents of the information input system. The following processing is executed in the information processing unit 301.

<Activating the Application>

As for a method of activating the application, the application is activated by a general activating method which operating systems usually provide.

It should be noted that an application associated with code information in the code information table may be automatically activated when a user places the medium 201 on the touch panel 101 and implements the calibration as will be described hereinafter.

<Calibration Step>

After activating the application, the information processing unit 301 implements a calibration step. At this step, the position, direction and code information of the medium 201 placed on the touch panel 101 are recognized by the above-described calibration method.

<Step of Accepting Touch Operation on The Medium>

When the calibration has finished, coordinate values in the touch panel coordinate system are enabled to be converted to coordinate values in the medium coordinate system by the above-described conversion method, which allows a user to carry out an operation of touching the medium 201.

When the user touches the printed surface of the medium 201, a coordinate value in the touch panel coordinate system is input and converted to the coordinate value in the medium coordinate system.

<Execution of Processing Corresponding to Coordinate Values>

The information processing unit 301 refers to an table stored in the storage and implements processing associated with coordinate values in the medium coordinate system.

To take a specific example, if a user inputs coordinates of an area printed as "Purchase" in the medium coordinate system of FIG. 6 by a touch operation, the information processing unit 301 implements such processing of starting a procedure of purchasing products selected by the user.

It should be noted that the operation of the user includes not only simply touching the medium 201, but also an operation of inputting a plurality of coordinate values by trailing (sliding) the finger in the handwriting input area on the medium 201. Therefore, it may be understood as the text and image are recognized and corresponding processing is implemented.

<Touch Panel>

The following will describe the touch panel 101 which is one of the constituents of the information input system.

The touch panel 101 used in the present invention is a touch panel of an electrostatic capacitance method, whether or not a display unit 102 is installed underneath the touch panel 101.

<Touch Panel with Camera>

Figure 24:
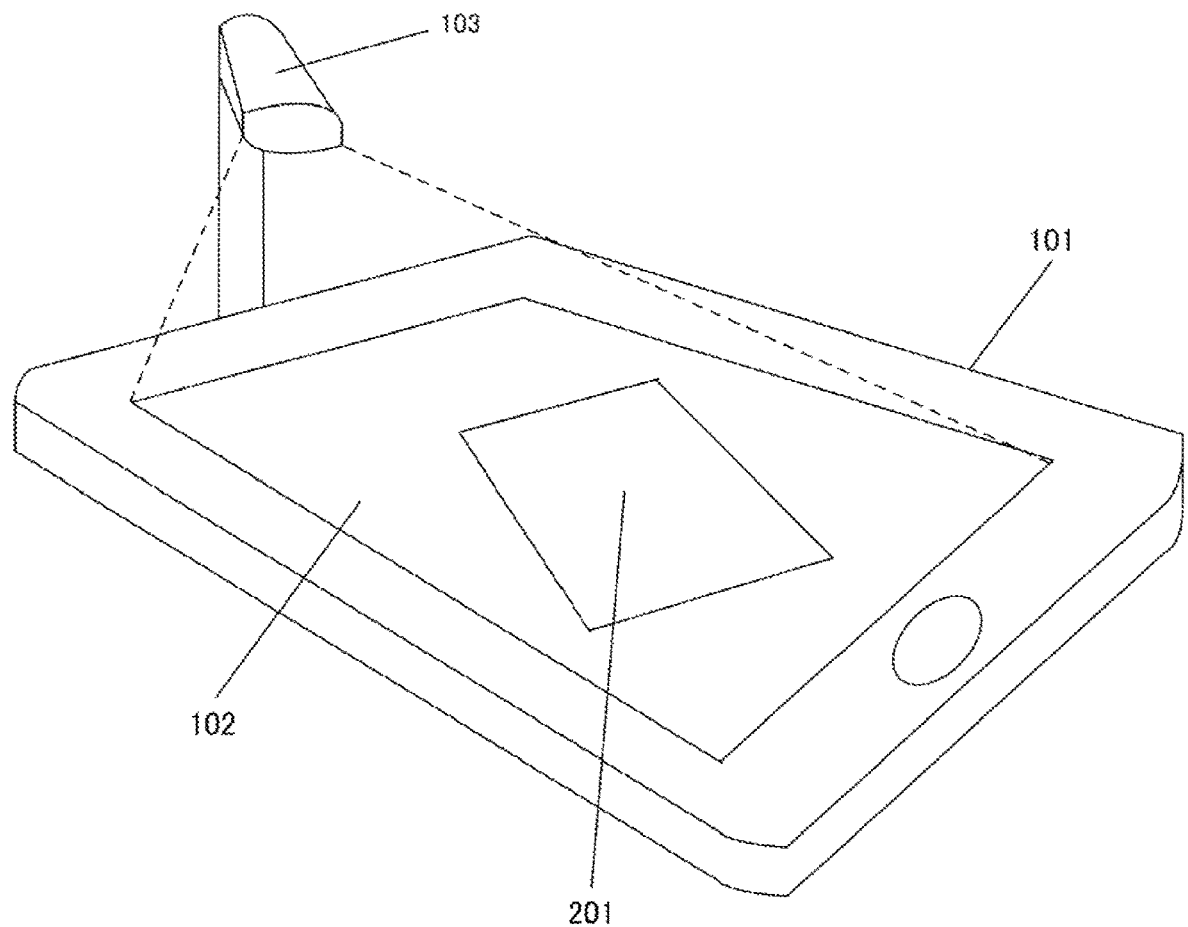
FIG. 24 is a diagram showing an example of providing a camera 103 on the touch panel 101.

A camera 103 (an optical reading unit) may be provided to the touch panel 101 as shown in FIG. 24 to subserve the calibration.

The camera 103 acquires image data by capturing the entire input surface of the touch panel 101. The image data is transmitted to an analysis unit 104 inside or outside the camera 103.

The camera 103 may be a visible light camera 103-A (not shown) which images visible light, or an invisible light camera 103-B (not shown) which images invisible light. The invisible light camera 103-B is used for imaging invisible barcodes and the like printed on the medium 201.

The analysis unit 104 analyzes image data, and recognizes the position, shape, and size of the medium 201. Further, code information is recognized by analyzing the barcode and the like printed on the medium 201, which will be described hereinafter. The analysis unit 104 transmits the analysis result to the information processing unit 301.

It should be noted that, instead of the analysis unit 104, the information processing unit 301 may analyze the image data.

<Medium>

The following will describe the medium 201 which is one of the constituents of the information input system.

<Printed Calibration Marks>

Figure 25:
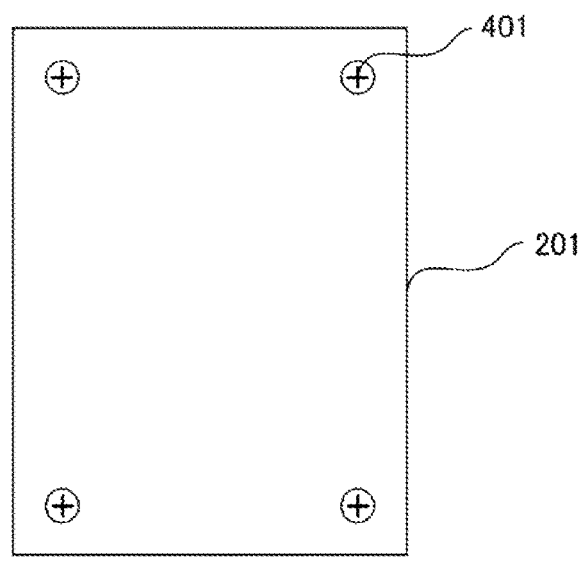
FIG. 25 is a diagram showing an example of printing calibration marks on the medium 201.

Referring to the plane view (the surface a user contacts) of the medium 201 in FIG. 25, calibration marks 401 are printed on the medium 201. The calibration marks 401 are marks for indicating the touch positions to the user for implementing the above-described calibration method. It should be noted that the positions may be indicated by other predetermined method, instead of the calibration marks 401.

While, according to FIG. 25, the calibration marks 401 are expressed by images, the touch positions may be expressed by predetermined positions of texts, photographs, or images (graphics) (refer to FIG. 8). It will be appreciated that the corners or predetermined positions in the frame of the medium may be predefined as touch positions instead of visually indicating the touch positions.

Further, those skilled in the art may arbitrarily design whether the touch positions are positions where calibration marks 401 themselves are printed, or, when the calibration marks 401 are arrow images and the like, positions directed by the calibration marks 401.

It should be noted that part or whole of the calibration marks 401 may not be printed or may be made invisible. In such a case, only a person who knows the touch positions for calibration can use the medium 201 with accurate calibration. That is, the calibration plays a role of user authentication.

<Medium with Holes>

Figure 26A:
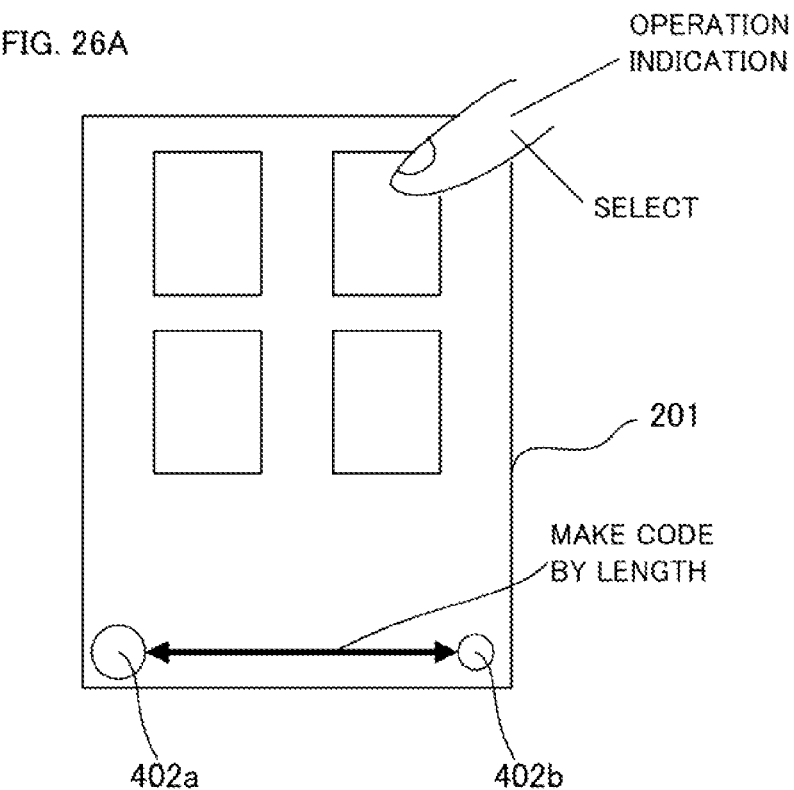
FIGS. 26A and 26B are diagrams showing an example of providing through-holes 402 on the medium.
Figure 26B:
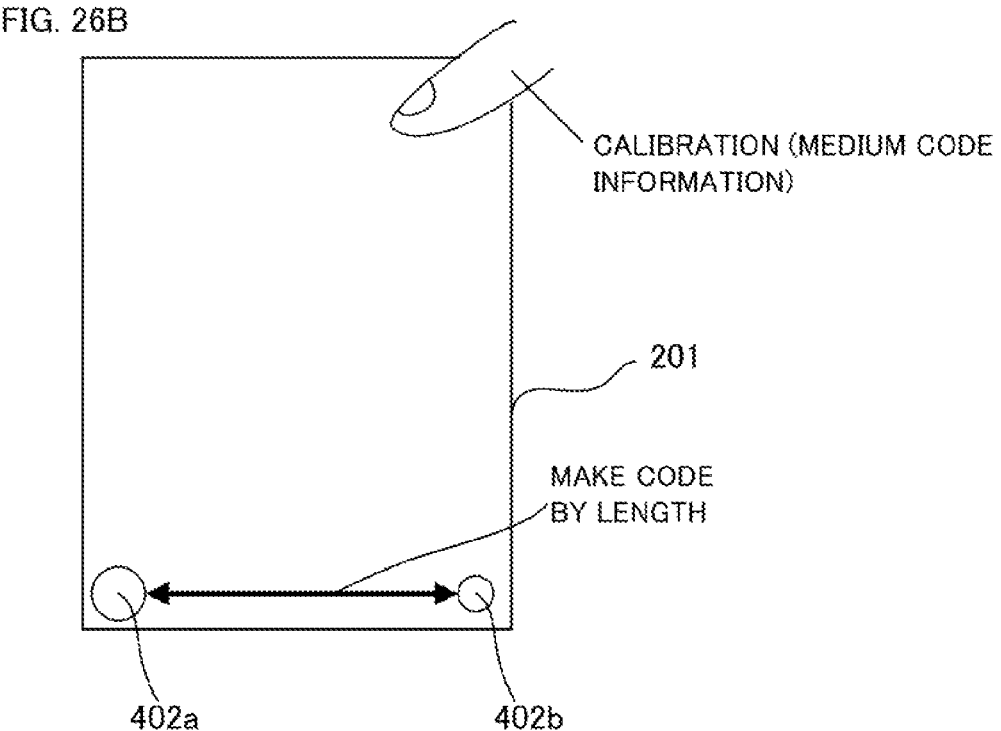

FIGS. 26A and 26B show an example of a medium 201 with holes. In FIGS. 26A and 26B, the medium 201 is provided with through-holes 402.

The through-holes 402, instead of calibration marks 401, indicate touch positions for calibration to a user. With the present touch panel, the user directly touches the touch panel 101 through the through-holes 402, not through the medium, which allows the user to surely recognize touching the touch panel.

Further, the sizes of the through-hole 402a and the through-hole 402b shown in FIGS. 26A and 26B are different so that a user can understand the order of touching by the size of the holes. Further, the amount of electrostatic capacitance can be changed by changing the area of the touch panel 101 touched by a user. In such a case, a variety of processing can be executed, such as, the order of touching the through-holes are expressed by predetermined positions using calibration marks or images, the information processing unit 301 recognizes a difference in the amount of the electrostatic capacitance of each through-hole to identify a plurality of code information, and other operational indications.

It should be noted that calibration marks 401 may be provided in addition to the through-holes 402, and code information may be recognized by these coordinate values.

<Medium with Notch>

Figure 27A:
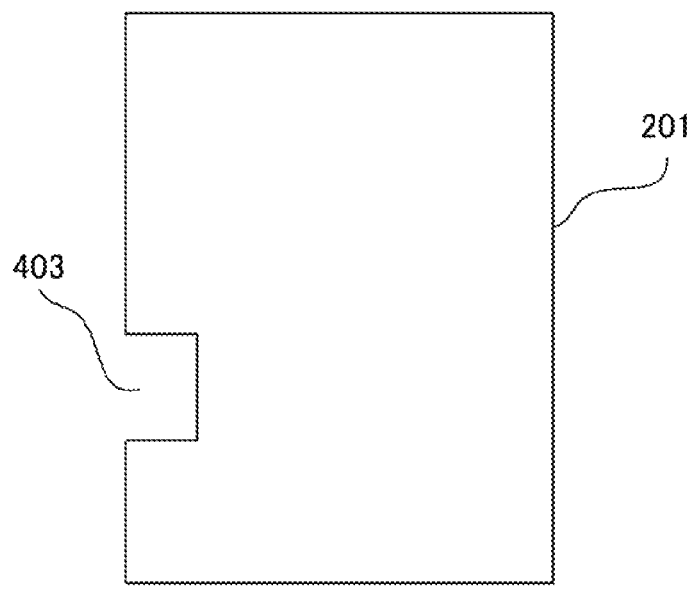
FIGS. 27A and 27B are diagrams showing an example of providing a notch portion 401 on the medium 201.
Figure 27B:
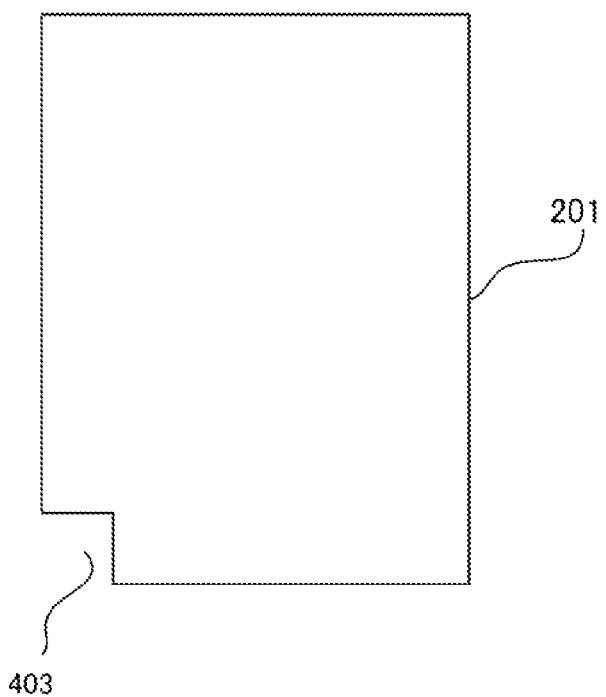

FIGS. 27A and 27B show an example of a medium 201 with a notch portion. In FIGS. 27A and 27B, the medium 201 is provided with a notch portion 403.

The notch portion 403, instead of calibration marks 401, indicates to a user a touch position for calibration. The user can implement a variety of processing just as directly touching the touch panel 101 via through-holes 403.

It should be noted that, in addition to the notch portion 403, calibration marks 401 or through-holes 402 may also be provided so that the code information is recognized from these coordinate values.

<Antiskid Agent or Adhesive on the Back Surface of Medium>

To prevent the medium 201 placed on the touch panel 101 from being out of alignment, the back surface of the medium (the surface contacting the touch panel 101) may be provided anti-skid processing or adhesive processing. It should be noted that anti-skid processing or adhesive processing are not required when the medium is used by sliding on the placing surface.

<Medium with RFID>

In the present invention, an RFID 202 can be provided on the surface or inside the medium 201, while providing an RFID reader 105 on the touch panel 101 to subserve calibration.

The RFID 202 stores code information so that code information of the medium 201 can be easily input without calibration.

The configuration of the medium with RFID will not be described herein, as Japanese Unexamined Patent Application Publication No. 2008-178499 describes in details.

<Medium Printed with Barcodes and the Like>

In the present invention, an example in which barcodes and the like are printed on the medium 201, while providing a camera 103 on the touch panel 101, will be described in detail.

The barcodes and the like refers to images which can define information based on a predetermined algorithm such as bar codes, QR codes (registered trademark), dot patterns (described in Japanese Patent No. 3706385), and the like.

The barcodes and the like may be printed with a visible ink or printed with an in visible ink. When an invisible ink is used, imaging should be performed by the above-described invisible light camera 103-B.

<Medium with Conductive Body>

The following will describe a configuration of a medium 201 with conductive bodies 203 to subserve calibration.

Here, the material of the conductive bodies 203 is required to be just as much electrostatically conductive as fingers. Specifically, sponge, gum, and conductive thread are publicly known to be used.

Medium with Conductive Body

First Example

Figure 28:
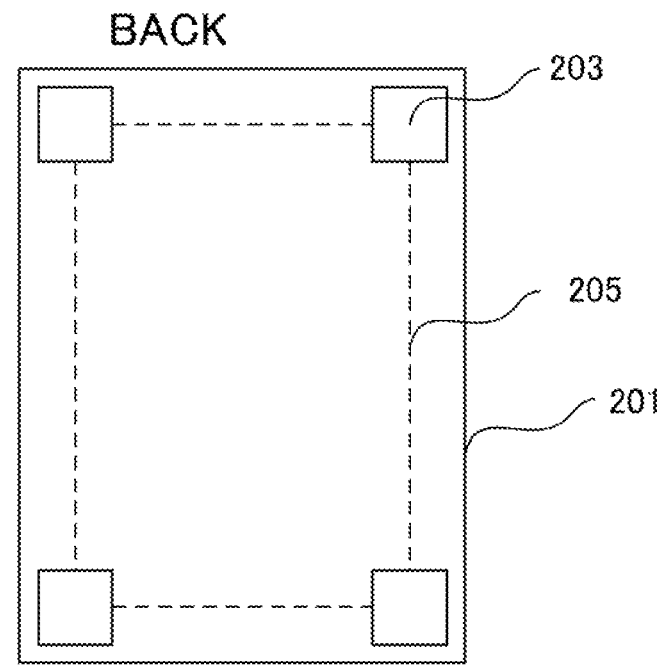
FIG. 28 is a diagram showing an example of providing conductive bodies 203 on the medium 201 (1)

According to the back surface of the medium 201 (a surface contacting the touch panel 101) in FIG. 28, conductive bodies 203 are provided at predetermined four portions of the medium 201 (the lower left corner, lower right corner, upper left corner, and upper right corner in FIG. 28).

The conductive bodies 203 are electrically connected by a conductive wire 205 provided on the periphery of the medium 201 as indicated by a dashed line.

It should be noted that each conductive body 203 may have a different amount of electrostatic capacitance by changing the volume. In such a case, the information processing unit 301 recognizes a difference in the amount of the electrostatic capacitance of each conductive body 203 to implement a variety of different processing.

Figure 29:
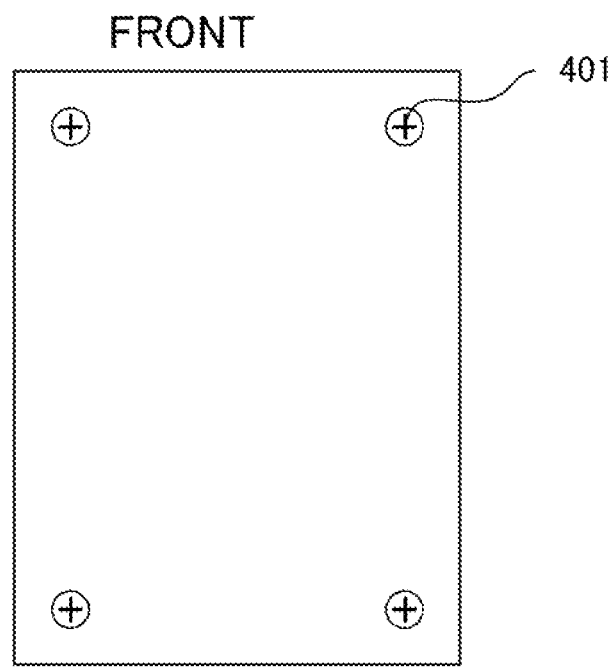
FIG. 29 is a diagram showing an example of providing conductive bodies 203 on the medium 201 (2)

According to the plane view of the medium 201 (a surface where a user touches and operates) of FIG. 29, calibration marks 401 are provided at predetermined four portions of the medium 201 (the lower left corner, lower right corner, upper left corner, and upper right corner in FIG. 29), that is, above the conductive bodies 203.

Figure 30:
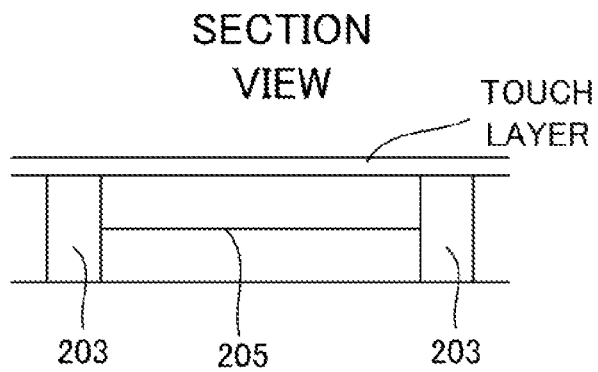
FIG. 30 is a diagram showing an example of providing conductive bodies 203 on the medium 201 (3)

Referring to the section view of the medium in FIG. 30, conductive portions 203 are electrically connected via the conductive line 205. Those skilled in the art will select as necessary whether providing the conductive line on the surface of the medium or inside the medium.

Having such a configuration, when a user touches one of the calibration marks 401, multi-touch input of the four points to the touch panel is enabled through the conductive bodies 203 and conductive line 205.

Here, the information processing unit 301 can recognize the position, orientation, and code information of the medium 201 by one touch operation without calibration of touching the medium 201a plurality of times with a finger as in the above-described calibration method.

In addition, even if the position of the medium 201 moves, calibration can be performed again each time the position moves, thus, information can be input by an operation of moving a card.

Further, the code information of the medium 21 or the code information and orientation of the medium 201 can be defined by: when the conductive body 203 is arranged at one portion, the amount of the electrostatic capacitance of the conductive body 203; when the conductive bodies 203 are arranged at two portions as dots, a distance between the arranged two portions as in the first calibration; or when the conductive bodies 203 are arranged at three or more portions as dots, the shape of a closed polygon made with the portions as vertexes as in the second to fifth calibrations.

Medium with Conductive Body

Second Example

Figure 31:
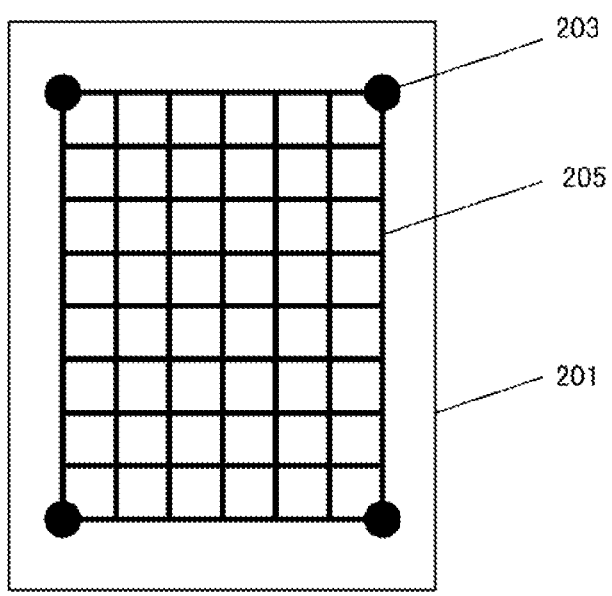
FIG. 31 is a diagram showing an example of providing conductive bodies 203 on the medium 201 (4)

According to the back surface of the medium 201 (a surface contacting the touch panel 101) in FIG. 31, conductive bodies 203 are provided at predetermined four portions of the medium 201 (the lower left corner, lower right corner, upper left corner, and upper right corner in FIG. 31).

It should be noted that each conductive body 203 may have a different amount of electrostatic capacitance by changing the volume. In such a case, the information processing unit 301 recognizes the amount of the electrostatic capacitance of each conductive body 203 to implement a variety of different processing.

The four conductive bodies 203 are electrically connected by the conductive wire 205 provided in a grid form as indicated by a dashed line. The four conductive bodies 203 may be electrically connected by providing metal foil 206 on the medium 201 instead of the conductive line 205.

Figure 32:
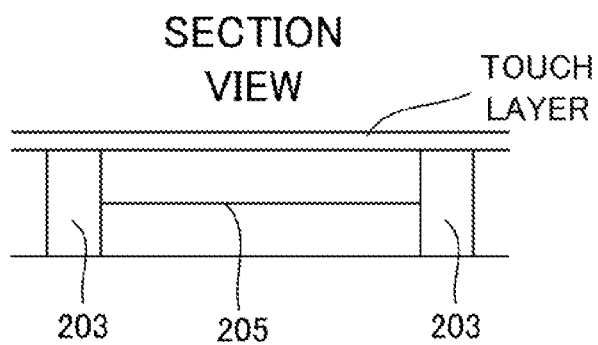
FIG. 32 is a diagram showing an example of providing conductive bodies 203 on the medium 201 (5)

Referring to the section view of the medium 201 in FIG. 32, the conductive portions 203 are electrically connected by the conductive wire 205. Whether providing the conductive line on the surface of the medium or inside the medium is a matter of arbitrary selection of those skilled in the art.

Having such a configuration, when a user touches an arbitrary position on the medium 201, multi-touch input of the four points to the touch panel is enabled through the conductive bodies 203 and conductive line 205.

In this case, the information processing unit 301 can recognize the position, orientation, and code information of the medium 201 by one touch operation without calibration of touching the medium 201a plurality of times with a finger as in the above-described calibration method. In addition, even if the position of the medium 201 moves, calibration can be performed again each time the position moves, thus, information can be input by an operation of moving a card.

Further, the code information of the medium 21 or the code information and orientation of the medium 201 can be defined by: when the conductive body 203 is arranged at one portion, the amount of the electrostatic capacitance of the conductive body 203; when the conductive bodies 203 are arranged at two portions as dots, a distance between the arranged two portions; or when the conductive bodies 203 are arranged at three or more portions as dots, the shape of a closed polygon with the portions as vertexes.

<Medium Printed with Conductive Bodies as Dot Pattern>

Figure 33:
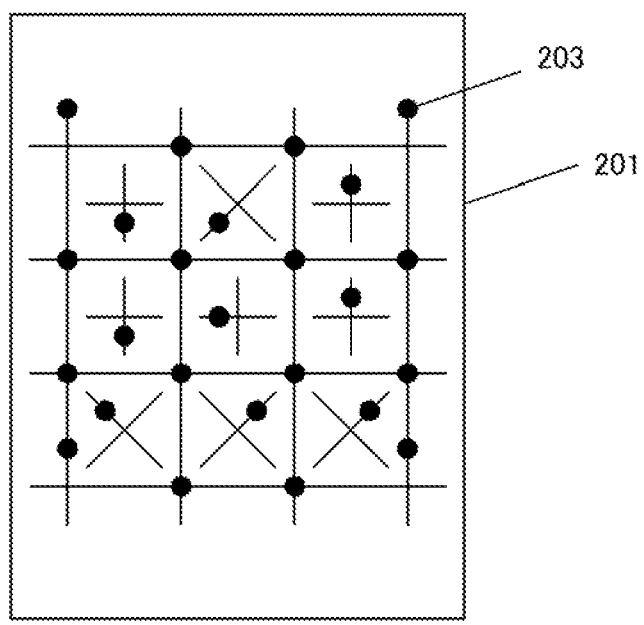
FIG. 33 is a diagram showing an example of printing conductive bodies 203 as a dot pattern on the medium 201.

FIG. 33 is a diagram showing a configuration of a medium 201 with conductive bodies 203 provided as a dot pattern which defines code values and/or coordinate values. As for the method of inputting and outputting information using a dot pattern, the details are described in Japanese Patent No. 4019114.

<Distinguishing from Touch by Fingertip>

In a configuration of the medium 201 with conductive bodies 203 provided thereon, distinction of a touch input to the touch panel 101 whether directly by a fingertip of a user or through a conductive body 203 is made possible by recognizing the amount of electrostatic capacitance of the fingertip of the user and the one of the conductive body 203 by the information processing unit 301. The explanation of the distinction method is omitted herein as it is elaborated in Japanese Unexamined Patent Application Publication No. 2010-61351.

Combination of Examples

The examples described so far can be combined as necessary. For example, the information processing device 301 recognizes the code information of the medium 201 with the RFID 202 and recognizes the position and orientation of the medium 201 with the conductive body 203.

<Medium Formed with Conductive Body>

FIGS. 34A to 35B are drawings illustrating a configuration of a medium formed with conductive material, that is, a conductive body.

In FIGS. 28 to 33, the medium itself is formed with paper, synthetic resin, and the like, and conductive bodies are provided by embedding the conductive bodies on the surface of or inside the medium.

In this example, the medium is formed with a conductive body itself. That is, the touch layer to be touched by the fingertip of a user and the conductive body are integratedly formed.

Figure 34A:
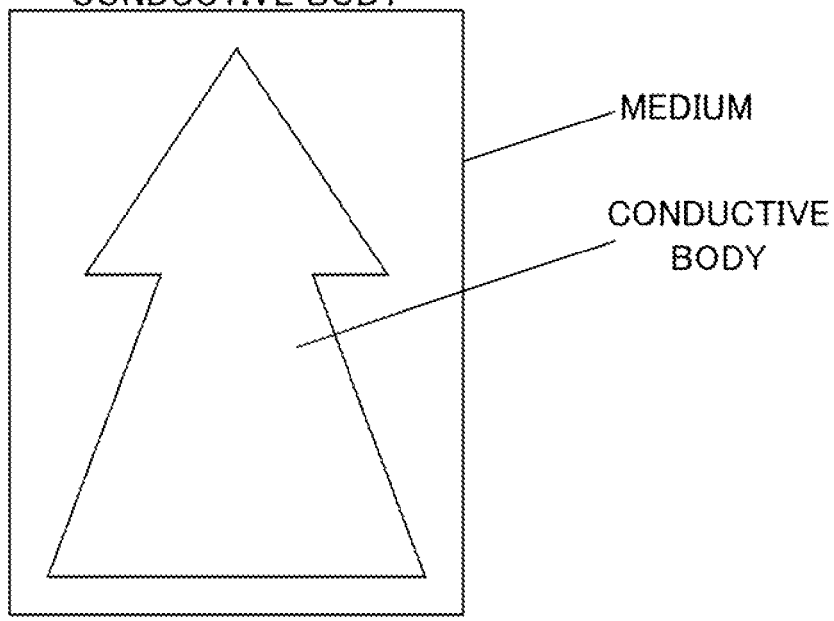
FIGS. 34A and 34B are diagrams illustrating a medium, part of which is conductive body.
Figure 34B:
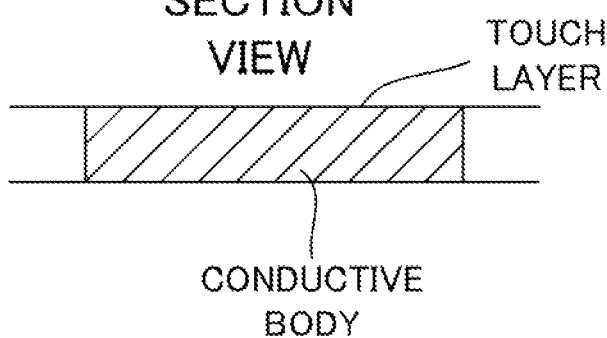

FIGS. 34A and 34B are diagrams showing a medium, part of which is formed with a conductive body; FIG. 34A is a plane view and FIG. 34B is a section view. In FIG. 34A, the area of a shape of two triangles, one on top of the other, is formed with a conductive body, and outside of the area is formed with general material for medium, such as paper, resin, and the like.

When a user places the medium on the touch panel, the information processing unit recognizes the shape of the conductive body and/or the amount of the electrostatic capacitance by the weak electric current from the conductive body. In this way, the shape of the conductive body and the amount of the electrostatic capacitance can be used as medium information. Further, as the shape of the conductive body can be recognized, by storing the shape of the conductive body in the storage in advance, the position and orientation of the medium can be recognized by a difference in the shape of the recognized conductive body and the shape of the conductive body stored in the storage. In this way, calibration by a user is not required, providing a highly convenient information input system with easy operation.

Figure 35A:
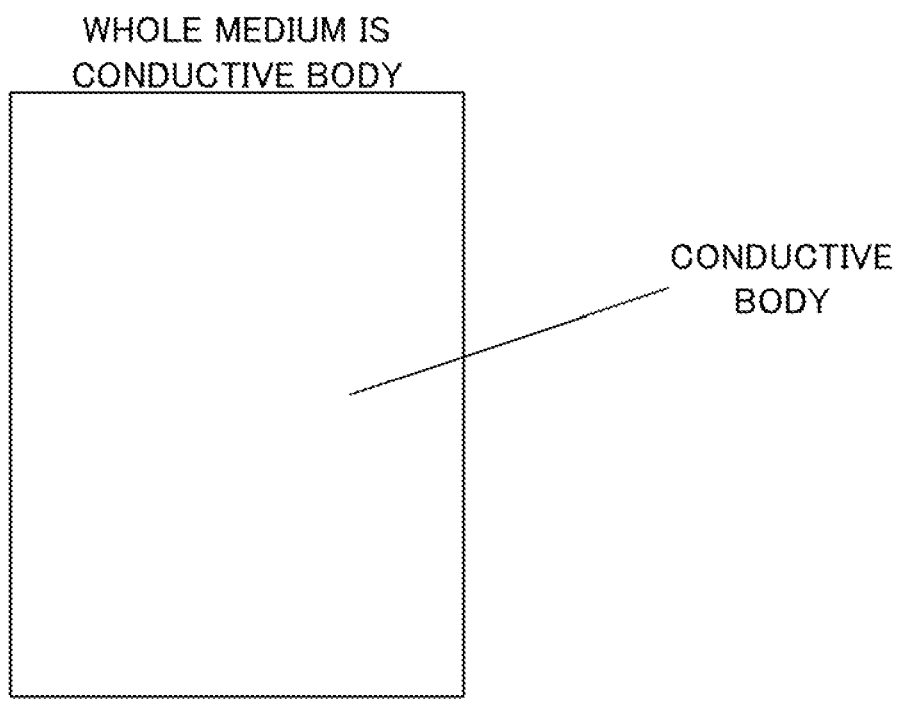
FIGS. 35A and 35B are diagrams illustrating a medium, the whole of which is conductive body.
Figure 35B:
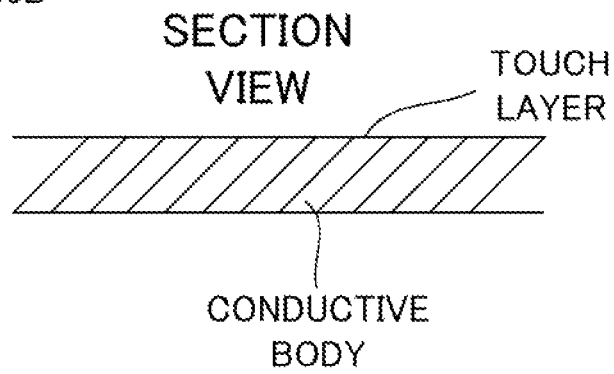

FIGS. 35A and 35B are diagrams a medium, the whole of which is formed with a conductive body; FIG. 35A is a plane view, and FIG. 35B is a section view.

When a user places the medium on the touch panel, the information processing unit recognizes the shape of the conductive body and/or the amount of the electrostatic capacitance by the weak electric current from the conductive body. In this way, the shape of the conductive body and the amount of the electrostatic capacitance can be used as medium information. Further, as the shape of the conductive body, that is, the shape of the medium can be recognized, by storing the shape of the medium in the storage in advance, the position and orientation of the medium can be recognized by a difference in the shape of the recognized conductive body and the shape of the conductive body stored in the storage by the weak electric current. In this way, calibration by a user is not required, providing a highly convenient information input system with easy operation. Further, as the whole medium is made with a conductive body, the recognition of the shape of the conductive body becomes easier compared with a case in which part of the conductive body is made with a conductive body, which simplifies the program and accelerates operation processing.

It should be noted that the conductive material includes carbon and metal (copper, nickel, tin, aluminum, and the like). The conductive body using the conductive material includes aluminum foil, other metal foil, conductive paper, conductive thread, and the like. The conductive paper is paper with conductivity, which includes conductive clean paper which is made by weaving conductive thread in clean paper, as will be described hereinafter, and conductive craft paper made by mixing carbon in craft paper. The conductive thread (conductive fiber) is a special thread which is made by mixing electro-conductive material such as metal and carbon and conducts electricity like metal. Specifically, the conductive thread includes Clacarbo (registered trademark) which is made by mixing conductive carbon or white metal oxide.

Figure 36A:
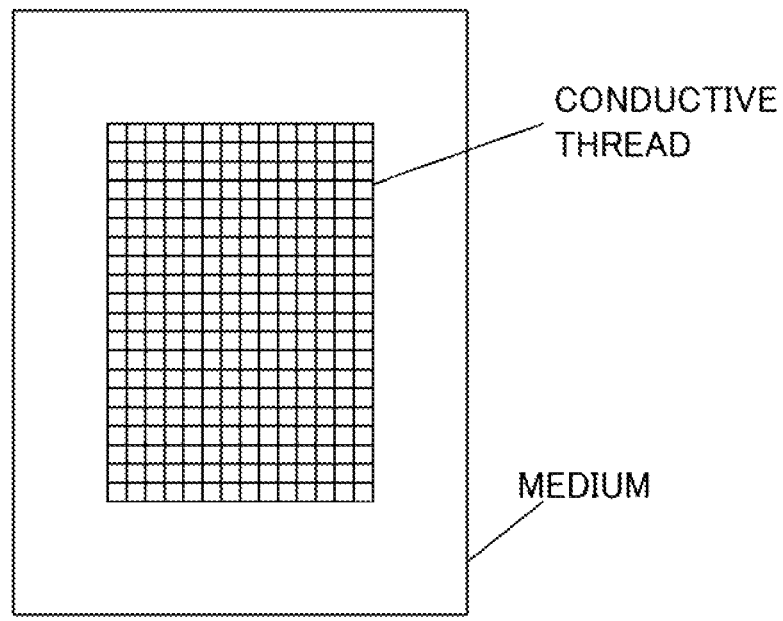
FIGS. 36A and 36B are plane views showing a medium formed by weaving conductive thread.
Figure 36B:
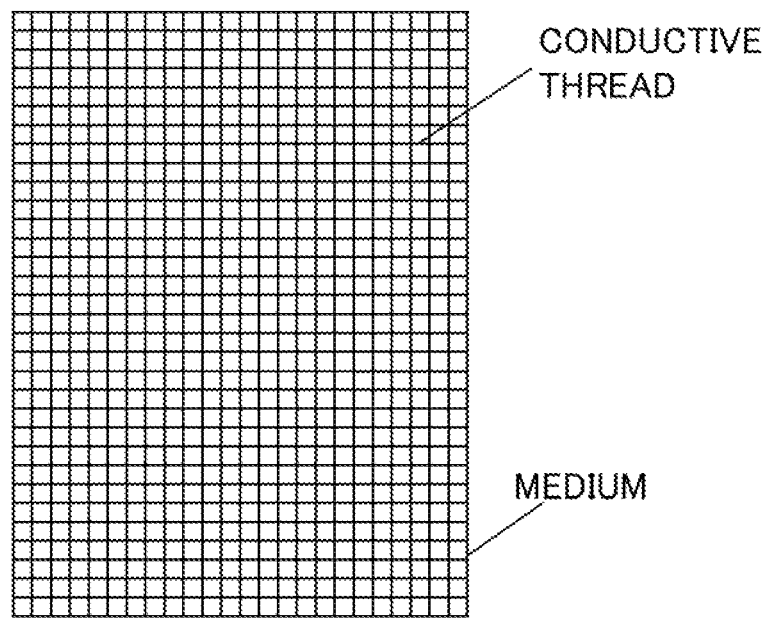

FIGS. 36A and 36B are diagrams illustrating a medium, part or whole of which is a conductive body, and the conductive body is conductive thread. FIG. 36A illustrates a case in which part of the medium is made with conductive thread, and FIG. 36B illustrates a case in which the whole medium is made with conductive thread.

When using conductive thread, the medium is formed by finely weaving the conductive thread.

FIGS. 37A to 39B are diagrams showing still other examples of the medium with conductive bodies.

Figure 37A:
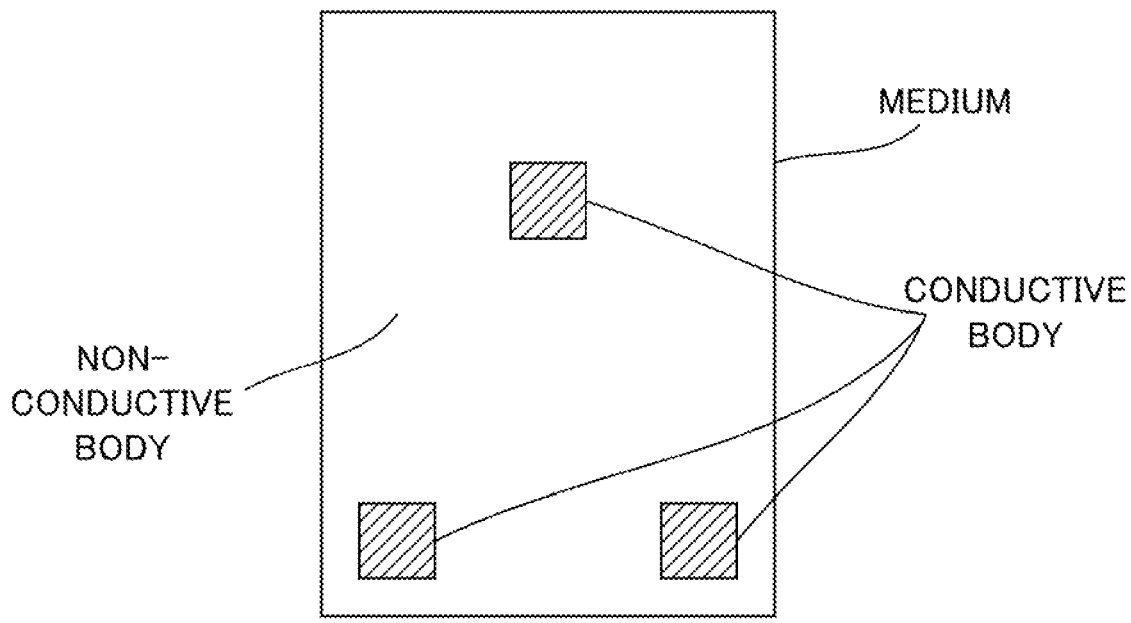
FIGS. 37A and 37B are diagrams illustrating a medium provided with punctiform conductive bodies.
Figure 37B:
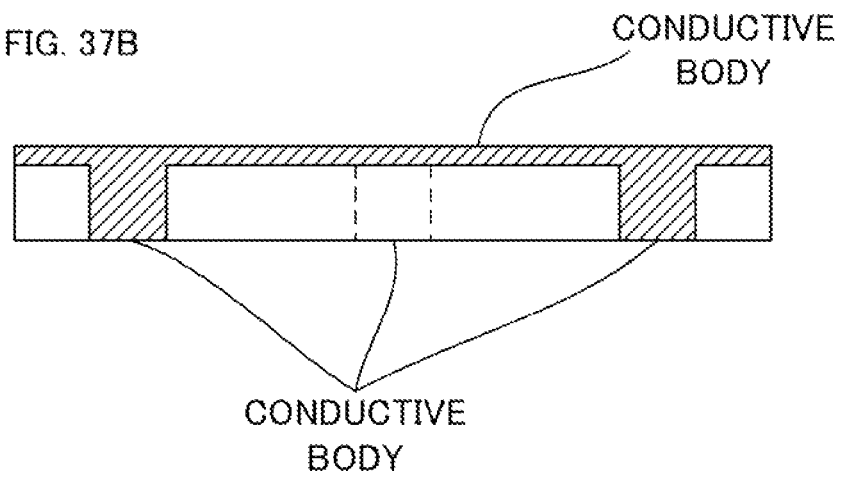

FIGS. 37A and 37B are diagrams showing still another example of a medium, part of which is a conductive body; FIG. 37A is a plane view, and FIG. 37B is a section view.

In the medium of FIGS. 37A and 37B, a conductive body is formed over the entire surface of the touch surface where a user touches and operates. Meanwhile, a plurality of conductive bodies (three in FIGS. 37A and 37B) are arranged as dots on the back surface (the surface contacting the touch panel 101) of the medium. The conductive body of the touch surface and the conductive body of the back surface are integrally formed.

When a user places the medium on the touch panel, the information processing unit receives a weak electric current from three conductive bodies arranged as dots. Then, three values of positions in the touch panel coordinate system where the weak electric current is received are input. The orientation of the medium is determined by lines connecting these three points, that is, the shape of a triangle formed by connecting these three points. Further, a specific point among the three points is defined as the position of the medium. Further, the code information is specified by defining the shape of the triangle formed by connecting the three points as code information.

Thereafter, the user carries out a touch operation to the medium, and the information processing unit implements processing based on the touch operation of the user. As this processing is the same as described above, the explanation is omitted here.

Having such a configuration, the position of the medium, the direction of the medium, and the code information are specified without calibration by a user. In this way, calibration by a user is not required, providing a highly convenient information input system with easy operation.

Figure 38A:
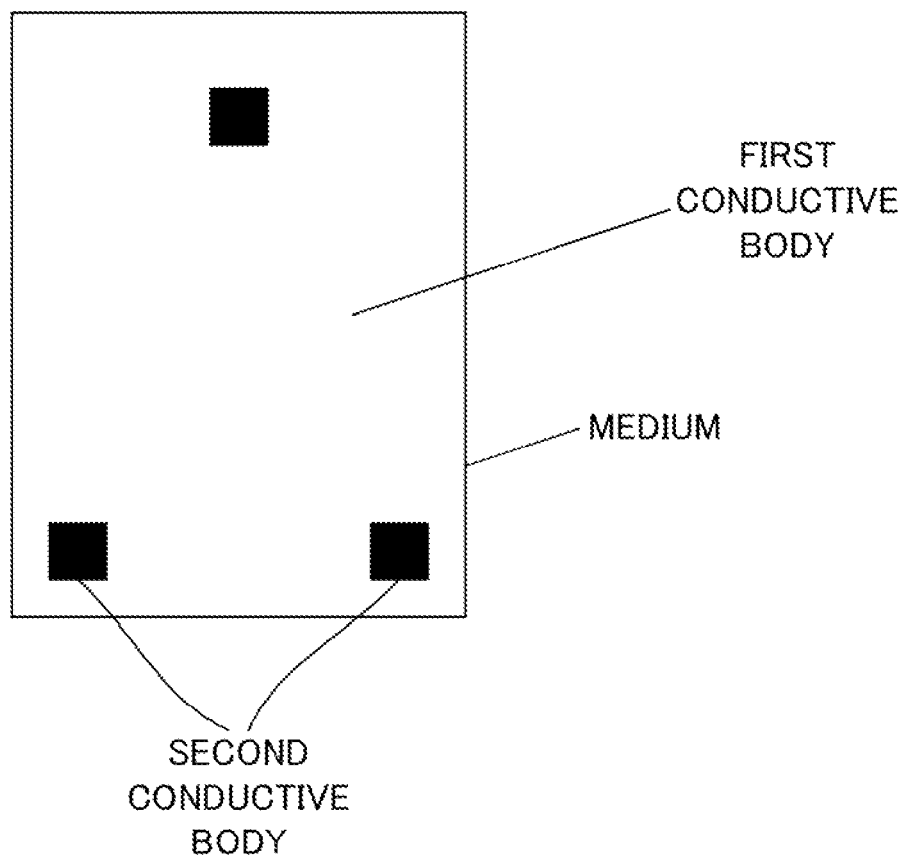
FIGS. 38A and 38B are diagrams illustrating a medium which has a first conductive body and a second conductive body.
Figure 38B:
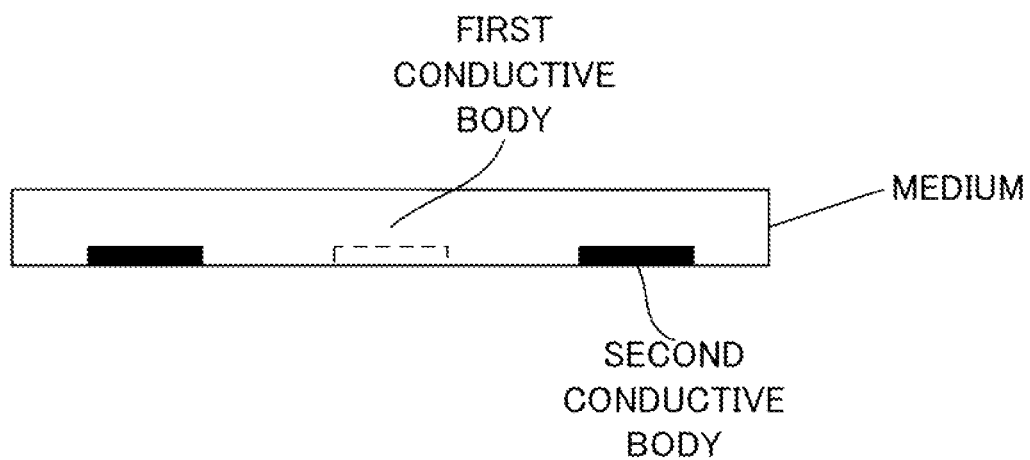

FIGS. 38A and 38B are diagrams showing still another example of a medium, the whole of which is a conductive body; FIG. 38A is a plane view, and FIG. 38B is a section view.

The medium of FIGS. 38A and 38B is formed with a first conductive body with low conductive rate, that is, with small electrostatic capacitance (a conductive body with first characteristic). An example of the first conductive body includes the above-described conductive paper. On the back surface of the medium (the surface contacting the touch panel 101), a plurality of second conductive bodies with high conductive rate, that is, a large electrostatic capacitance (a conductive body having a second characteristic) are arranged as dots (three in FIGS. 38A and 38B).

When a user places the medium on the touch panel, the information processing unit receives a weak electric current from the medium. As for the weak electric current, two kinds of weak electric currents, a weak electric current from the first conductive body and a weak electric current from the second conductive body, flow, and the weak electric current from the second conductive body is greater. The information processing unit senses the amount of the electrostatic capacitance of the first conductive body and the second conductive body, and recognizes the weak electric current from the second conductive body. Then, three values of coordinates of positions in the touch panel coordinate system where the electric current is received are input. The orientation of the medium is determined by lines connecting these three points, that is, the shape of a triangle formed by connecting these three points. Further, a specific point among the three points is defined as the position of the medium. Further, the code information is specified by defining the shape of the triangle formed by connecting the three points as the code information.

Thereafter, the user carries out a touch operation to the medium, and the information processing unit implements processing based on the touch operation of the user. As this processing is the same as the one described above, the explanation is omitted.

Having such a configuration, the position of the medium, the direction of the medium, and the code information are specified without calibration by a user. In this way, calibration by a user is not required, providing a highly convenient information input system with easy operation.

Figure 39A:
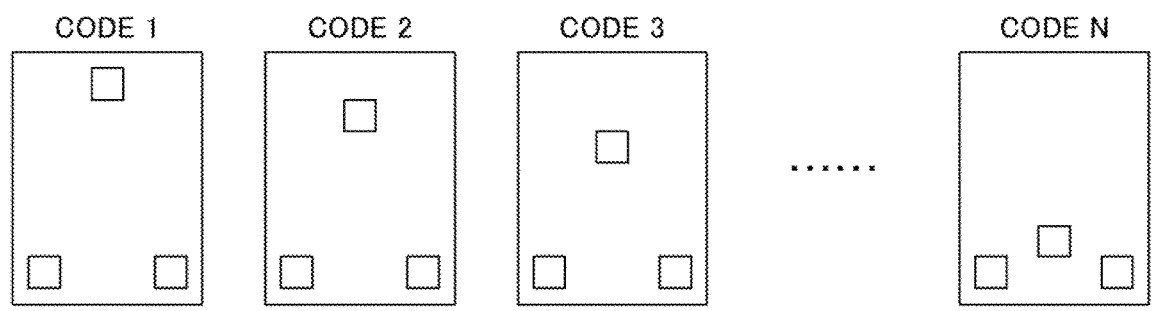
FIGS. 39A and 39B are diagrams showing an example of a method of defining code information.
Figure 39B:
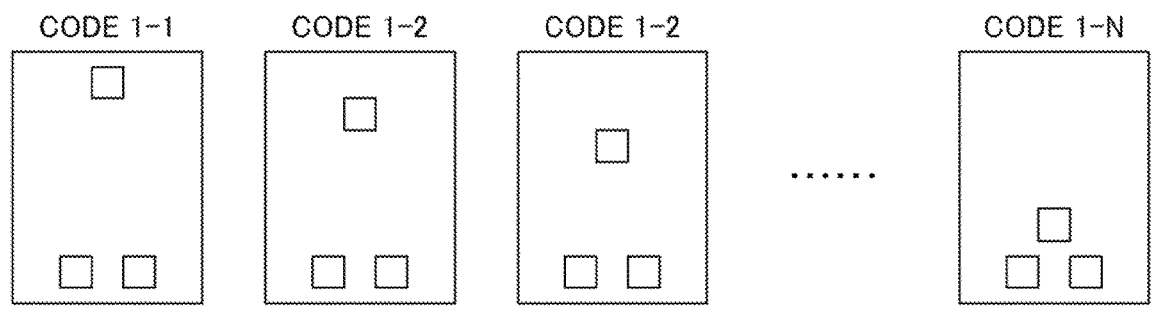

FIGS. 39A and 39B are explanatory views showing a relationship among the positions of the conductive bodies of FIGS. 37A and 37B and the second conductive bodies of FIGS. 38A and 38B (hereinafter, "conductive bodies/second conductive bodies") and code information.

The code information can be defined by the shape of a triangle formed by connecting the three conductive bodies/second conductive bodies. In FIG. 39A, the length of the base is constant, and the code information is changed by changing the position of the vertex. For example, if a case where the vertex is at the uppermost is defined as code 1, each time the vertex is shifted downward in a vertical direction by a predetermined distance, the code number becomes code 2, code 3, . . . code n. In FIG. 39B, the length of the base is shorter than the one in FIG. 39A and the length is made constant, and the code information is changed by changing the position of the vertex. For example, a case where the vertex is at the uppermost is defined by code 1-1, and each time the vertex is shifted downward in a vertical direction by a predetermined distance, the code information becomes code 1-2, code 1-3, . . . code 1-n. Thus, even if the position of the vertex is the same, if the length of the base is different, code information becomes different.

Further, the code information can also be changed by changing the length of the base while keeping the position of the vertex constant.

Further, the code information can be changed by changing the shape of the conductive bodies/second conductive bodies while keeping the shape of the triangle constant. For example, the code information can be changed by changing the sizes of the conductive bodies/second conductive bodies. Further, the code information can be changed by changing the shape of the conductive bodies/second conductive bodies to a quadrangle or a circle.

It should be noted that, in this example, the number of the conductive bodies/second conductive bodies are not limited to three. It will be appreciated that the number thereof are arbitrary as long as the position, orientation and code information of the medium can be specified.

As described so far, the orientation and position of a medium can be recognized by the material forming the medium, the shape of the conductive bodies, the strength of the conductive bodies, and the method of arranging the conductive bodies as dots, and the like.

Further, in the present invention, numbers from 0 to 9 may be provided to the medium and, when a user touches the numbers, a password may be input.

Further, in the examples of FIGS. 37A to 39B, touching of a user as described with reference to FIG. 10 and the like may be performed. In this way, in addition to the positions of the conductive bodies/second conductive bodies, the order of touching by a user can be defined as code information. That is, a lot more code information can be defined by setting code information by combining the positions of the conductive bodies/second conductive bodies and the order of touching by the user. Thus, the present invention realizes to provide a lot of contents and applications, and a flexible and diverse information input system.

The above-described examples can be implemented in combination as necessary.

INDUSTRIAL APPLICABILITY

A variety of industrial applicabilities can be considered with regard to the present invention, such as an interface device or a thin-client terminal of: personal computers (PC), audio visual equipment, mobile telephones, information terminals, game machines, educational materials, shopping terminals, advertisement terminals, machine tools, printing machines, and the like.

DESCRIPTION OF REFERENCE NUMERALS AND SIGNS

101 TOUCH PANEL
102 DISPLAY UNIT
103 CAMERA
103-A VISIBLE LIGHT CAMERA
103-B INVISIBLE LIGHT CAMERA
104 ANALYSIS UNIT
105 RFID READER
201 MEDIUM
202 RFID
203 CONDUCTIVE BODY
301 INFORMATION PROCESSING UNIT
401 CALIBRATION MARK
402 THROUGH-HOLE
403 NOTCH PORTION

The invention claimed is:

1. An information input system comprising:
a touch panel which receives an operation from a user by an electrostatic capacitance method;
an information processing unit which uses the touch panel as input means; and
a thin-plate medium to be placed on the touch panel, wherein the information processing unit implements a first step of associating, by means of a predetermined input operation in which the user touches predetermined positions of said medium in a predetermined order and/or slides on said medium, an existing area of the medium with a position where the input operation is performed, and associating medium information with the medium wherein the medium information is recognized based on the input operation and comprises code information, a placing position and a placing direction of said medium, and
wherein the medium is printed with a text and/or an image comprising at least any one of a number, a letter, a symbol, and an icon, or a handwriting input area for indicating the input operation on the medium surface to the user.

2. The information input system according to claim 1, wherein
after the first step, the information processing unit further implements a second step of recognizing coordinate values in a coordinate system of the touch panel for identifying a position touched by a predetermined touch operation.

3. The information input system according to claim 2, wherein,
at the second step, the information processing unit converts coordinate values in the touch panel coordinate system into coordinate values in a coordinate system of the medium for identifying the touch position on the medium surface based on the medium information.

4. The information input system according to claim 3, wherein,
after the second step, the information processing unit implements a third step of implementing processing based on an operation indication associated with the coordinate values in the medium coordinate system by referring to a storage which stores the association.

5. The information input system according to claim 4, wherein
the operation indication is recognized from a letter and a figure drawn by a user on the medium surface.

6. The information input system according to claim 2, wherein
the medium is printed with a text and/or an image or a handwriting input area for indicating the touch operation on the medium surface.

7. The information input system according to claim 1, wherein
the medium comprises a conductive body on a surface facing the touch panel or at a predetermined position inside the medium, and
the information processing unit recognizes the medium information by sensing a difference in a number of the conductive bodies and arranged positions thereof, or a difference in amount of electrostatic capacitance of each conductive body.

8. The information input system according to claim 7, wherein
the medium has: a touch layer to be touched by a finger of the user; and
a conductive body which is electrically connected with the conductive body contacting the touch.

9. The information input system according to claim 8, wherein a stylus pen can also be used to touch.

10. The information input system according to claim 7, wherein
the conductive body has different electrostatic capacitance characteristics from that of the finger of the user who touches the touch panel surface or the medium surface placed on the touch panel surface, and
the information processing unit distinguishes the difference in the electrostatic capacitance characteristics.

11. The information input system according to claim 7, wherein
the conductive body is formed by punctiform conductive bodies and a linear conductive body which connects the punctiform conductive bodies.

12. The information input system according to claim 1, wherein
the predetermined input operation is an operation in which a user touches at least two predetermined positions on the medium surface or at least two marks provided on the medium surface in a predetermined order, and
the information processing unit recognizes: a placing position and a placing direction of the medium which are defined by a pattern formed by including the predetermined positions on the medium surface or the touch positions of the marks and the touching order; or the placing position, the placing direction, and the code information.

13. The information input system according to claim 12, wherein
the information processing unit measures elapsed time, with reference to time when the user first touches one of the predetermined positions on the medium or the predetermined marks,
until the user touches another one of the predetermined positions on the medium or the predetermined marks next time, and
recognizes the code information of the medium by the elapsed time or by a combination of the elapsed time and a pattern formed by including the predetermined positions on the medium surface or the touch positions of the marks and the touching order.

14. The information input system according to claim 12, wherein
the predetermined input operation also works as user authentication of the medium.

15. The information input system according to claim 12, wherein
the predetermined positions of the medium surface are positions near corners of the medium or positions near a periphery of the medium.

16. The information input system according to claim 12, wherein
the predetermined positions of the medium surface are positions indicated to the user by holes and/or notch portions provided on the medium surface.

17. The information input system according to claim 1, comprising:
an optical reading unit which captures an image of an operation surface of the touch panel; and
an analysis unit which analyzes the captured image,
wherein the information processing unit, together with the predetermined input operation, recognizes the code information by recognizing a shape, a size, and a placing position of the medium by an outline of the medium placed on the touch panel and/or causing the analysis unit to analyze an image printed on the medium surface.

18. The information input system according to claim 17, wherein
the medium is printed with a dot pattern which defines the code information according to a predetermined algorithm and is readable using light of a predetermined wavelength, and
the information processing unit recognizes the code information by causing the optical reading unit to read the dot pattern by capturing only the light of the predetermined wavelength and causing the analysis unit to analyze the dot pattern.

19. The information input system according to claim 1, wherein the information processing unit decodes a shape and a size of the medium associated with the code information by referring to a storage which stores the association.

20. The information input system according to claim 1, wherein
the predetermined input operation is an operation in which the user touches at least three predetermined positions on the medium surface or at least three marks provided on the medium surface, and
the information processing unit recognizes: a placing position and a placing direction of the medium which are defined by a pattern formed by the predetermined positions on the medium surface or the touch positions of the marks; or the placing position, the placing direction, and code information.

21. The information input system according to claim 1, wherein
the predetermined input operation is an operation in which the user draws a text and/or an image on the medium, and
the information processing unit recognizes the placing position and the placing direction of the medium, which are defined by the text and/or the image, or the placing position, the placing direction and the code information.

22. The information input system according to claim 1, wherein
the placing surface of the medium is provided with antiskid material or adhesive.

23. The information input system according to claim 1, wherein
the medium is a card shape or a coin shape.

24. The information input system according to claim 1, wherein
the first step of the information processing unit further activates an application and/or a content associated with the code information, and controls execution of the application and/or the content according to the touch operation in which the user touches and/or slides on the medium.

25. The information input system according to claim 1, further comprising:
an information processing device which activates an application and/or a content associated with the code information, and controls execution of the application and/or the content according to the touch operation in which the user touches and/or slides on the medium.

26. The information input system according to claim 1, wherein the information processing unit recognizes the code information, together with the predetermined input operation, recognizes the code information with a Radio Frequency IDentification (RFID) which is provided at a predetermined position on the medium and records the code information and an RFID reader which reads information recorded in the RFID.

27. The information input system according to claim 1, wherein
the medium comprises a conductive body on a surface facing the touch panel or at a predetermined position inside the medium,
the information processing unit recognizes the medium information by sensing a difference in a number of the conductive bodies and arranged positions thereof, or a difference in amount of electrostatic capacitance of each conductive body, and
the information processing unit, together with the predetermined input operation, recognizes the code information of the medium with a Radio Frequency IDentification (RFID) which is provided at a predetermined position on the medium and records the code information and an RFID reader which reads information recorded in the RFID, and recognizes the placing position and the placing direction of the medium by the arranged positions of the conductive bodies.

28. A medium to be placed on a touch panel of an electrostatic capacitance method, the touch panel comprising input means of an information processing unit,
wherein the medium comprises a conductor formed in a linear shape on at least a part of the surface or inside of the medium,
a conductor unit formed to be made to come in contact with the touch panel and the conductor formed in a linear shape are electrically connected,
and the conductor unit is detected by the touch panel through the conductor formed in a linear shape when the surface of the area of the medium where the conductor formed in a linear shape is touched by a finger, and
the information processing unit is to implement processing associated with a shape, an arrangement, or an amount of electrostatic capacitance of the detected conductor unit.

29. The medium according to claim 28, wherein the conductor unit is aluminum foil or conductive paper.

30. The medium according to claim 28, wherein the conductor unit includes carbon.

31. The medium according to claim 28, wherein the conductor unit is formed by weaving conductive thread.

32. The medium according to claim 28, wherein
the placing surface of the medium is provided with antiskid material or adhesive.

33. The medium according to claim 28, wherein
the medium is a card shape or a coin shape.

34. The medium according to claim 28, wherein a stylus pen can also be used to touch.

35. The information input system according to claim 28, wherein
a dot pattern which defines code values and/or coordinate values is formed by the conductor unit.

36. A medium which is to be placed on a touch panel of an electrostatic capacitance method, the touch panel comprising input means of an information processing unit, wherein
the medium is printed with an image and/or a text which indicates an operation to be carried out by a user for the information processing unit to associating, by means of a predetermined input operation in which the user touches predetermined positions of said medium in a predetermined order and/or slides on said medium, an existing area of the medium with a position where the input operation is performed, and associating medium information with the medium wherein the medium information is recognized based on the input operation and comprises a placing position, a placing direction of the medium on the touch panel and code information, and
wherein the medium is printed with a text and/or an image comprising at least any one of a number, a letter, a symbol, and an icon, or a handwriting input area for indicating the input operation on the medium surface to the user.

37. The medium according to claim 36, wherein
the medium is aluminum foil or conductive paper.

38. The medium according to claim 36, wherein
the medium includes carbon.

39. The medium according to claim 36, wherein
the medium is formed by weaving conductive thread.

40. A non-transitory computer-readable medium storing a program executed by an information processing unit which comprises a touch panel of an electrostatic capacitance method as input means, wherein
a thin-plate medium is to be placed on the touch panel, and
the program causes the information processing unit to implement:
a first step of associating, by means of a predetermined input operation in which the user touches predetermined positions of said medium in a predetermined order and/or slides on said medium, an existing area of the medium with a position where the input operation is performed, and associating medium information with the medium wherein the medium information is recognized based on the input operation and comprises code information, a placing position and a placing direction of said medium, and wherein the medium is printed with a text and/or an image comprising at least any one of a number, a letter, a symbol, and an icon, or a handwriting input area for indicating the input operation on the medium surface to the user.

41. The non-transitory computer-readable medium according to claim 40, wherein after the first step, the program further causes the information processing unit to implement:

a second step of recognizing coordinate values in a coordinate system of the touch panel for identifying a position touched by a predetermined touch operation.

42. An information input system comprising:

a touch panel which accepts an operation from a user by an electrostatic capacitance method;

an information processing unit which uses the touch panel as input means;

a thin-plate medium to be placed on the touch panel, wherein the thin-plate medium comprises a conductor formed in a linear shape on at least a part of a surface of the medium or inside of the medium, a conductor unit formed to be made to come in contact with the touch panel and the conductor formed in a linear shape are electrically connected, and the touch panel detects the conductor unit through the conductor formed in a linear shape when the surface of the area of the medium where the conductor formed in a linear shape is touched by a finger, and the information processing unit implements processing associated with a shape, an arrangement, or an amount of electrostatic capacitance of the detected conductor unit.

43. The information input system according to claim 42, further comprising: an information processing device, wherein the information processing device activates an application and/or a content associated with the medium, and controls execution of the application and/or the content by a touch operation in which the user touches and/or slides on the medium surface.

* * * * *